(12) United States Patent
Shimbo et al.

(10) Patent No.: US 11,615,708 B2
(45) Date of Patent: Mar. 28, 2023

(54) COLLISION AVOIDANCE CONTROL APPARATUS

(71) Applicant: Toyota Jidosha Kabushiki Kaisha, Toyota Aichi-ken (JP)

(72) Inventors: Yuto Shimbo, Toyota (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 16/741,192

(22) Filed: Jan. 13, 2020

(65) Prior Publication Data

US 2020/0226930 A1 Jul. 16, 2020

(30) Foreign Application Priority Data

Jan. 15, 2019 (JP) .............................. JP2019-004205

(51) Int. Cl.
*G08G 1/16* (2006.01)
*G05D 1/02* (2020.01)
(Continued)

(52) U.S. Cl.
CPC ............. *G08G 1/165* (2013.01); *B60W 30/09* (2013.01); *G05D 1/0214* (2013.01);
(Continued)

(58) Field of Classification Search
CPC .. B60T 7/22; B60T 8/17558; B60T 2201/022; B60W 10/06; B60W 10/184; B60W 10/20; B60W 30/08; B60W 30/09; B60W 30/0953; B60W 30/0956; B60W 50/14; B60W 2520/10; B60W 2540/10; B60W 2540/12; G01S 13/867; G01S 13/931; G05D 1/0214; G05D 1/0223; G05D 2201/0213; G08G 1/165; G08G 1/166; G06V 20/58

See application file for complete search history.

(56) References Cited

U.S. PATENT DOCUMENTS

| | | | |
|---|---|---|---|
| 2009/0022368 A1* | 1/2009 | Matsuoka | G06F 3/013 |
| | | | 382/103 |
| 2014/0139369 A1* | 5/2014 | Baba | G01S 13/931 |
| | | | 342/146 |

(Continued)

FOREIGN PATENT DOCUMENTS

| | | |
|---|---|---|
| CN | 107921969 A | 4/2018 |
| JP | 2017-043173 A | 3/2017 |
| JP | 2017-211973 A | 11/2017 |

*Primary Examiner* — Jeff A Burke
*Assistant Examiner* — Blake A Wood
(74) *Attorney, Agent, or Firm* — Dinsmore & Shohl LLP

(57) ABSTRACT

Provided is a collision avoidance control apparatus including a first sensor; a second sensor; a controller configured to execute collision avoidance control; and a memory configured to, when a specific object has been detected, record information on the detected specific object, the specific object being an object which has been detected by both of the first sensor and the second sensor, in which the controller is configured to execute the collision avoidance control when determining that there is an object based on any one of the first sensor and the second sensor, and determining that the object has been already recorded as the specific object in the memory.

8 Claims, 12 Drawing Sheets

(51) Int. Cl.
*G06V 20/58* (2022.01)
*B60W 30/09* (2012.01)

(52) U.S. Cl.
CPC .......... *G05D 1/0223* (2013.01); *G06V 20/58* (2022.01); *G05D 2201/0213* (2013.01)

(56) References Cited

U.S. PATENT DOCUMENTS

| | | | |
|---|---|---|---|
| 2017/0309180 A1* | 10/2017 | Baba | B60R 21/00 |
| 2018/0350083 A1* | 12/2018 | Fang | G01S 17/931 |
| 2019/0009774 A1* | 1/2019 | Yamashita | B60W 30/09 |
| 2019/0232956 A1 | 8/2019 | Takaki | |
| 2020/0184283 A1* | 6/2020 | Tateiwa | G06K 9/6288 |

* cited by examiner

COLLISION AVOIDANCE CONTROL APPARATUS

CROSS-REFERENCES TO RELATED APPLICATION

The present application claims priority to Japanese patent application No. JP 2019-004205 filed on Jan. 15, 2019, the content of which is hereby incorporated by reference in its entirety.

BACKGROUND

1. Technical Field

The present disclosure relates to a collision avoidance control apparatus for a vehicle configured to execute collision avoidance control when there is an object in front of the vehicle.

2. Description of the Related Art

Hitherto, there has been proposed a collision avoidance control apparatus for a vehicle configured to execute collision avoidance control when there is a high possibility that the vehicle collides with an object (target object) existing in front of the vehicle (see Japanese Patent Application Laid-open No. 2017-043173). Such collision avoidance control is also called "pre-collision safety control (PCS)" or "pre-crash safety control (PCS)".

The above-mentioned collision avoidance control includes alert control for alerting a driver to the possibility of a collision, driving force suppression control for suppressing a driving force of the vehicle, and braking force control for applying a braking force to wheels of the vehicle.

An apparatus (hereinafter, referred to as a "related-art apparatus") disclosed in Japanese Patent Application Laid-open No. 2017-043173 determines whether or not there is an object in front of the vehicle through use of a first sensor and a second sensor. The first sensor is configured to radiate an ultrasonic wave or an electromagnetic wave in a front region of the vehicle, and is an ultrasonic sensor or a radar sensor, for example. The second sensor is configured to take/capture an image in a front range of the vehicle, and is a monocular camera, for example. When determining that there is an object in front of the vehicle, the related-art apparatus limits the driving force of the vehicle such that the driving force does not exceed an upper limit value (that is, executes the driving force suppression control).

When both of the first sensor and the second sensor detect an object, the related-art apparatus executes the driving force suppression control because there is a high possibility that the object actually exists in front of the vehicle. On the other hand, when only one of the first sensor and the second sensor detects an object, there is a possibility that the object does not actually exist. Thus, the related-art apparatus does not execute the driving force suppression control under a predetermined condition.

It is assumed that, in a situation in which the vehicle travels at a speed equal to or higher than a predetermined vehicle speed threshold (e.g., 10 km/h), the first sensor detects an object, meanwhile the second sensor does not detect that object. In this situation, the related-art apparatus does not execute the driving force suppression control. However, the second sensor may not detect the object which actually exists due to false recognition. In this case, there is a risk that the vehicle may come too close to the object.

SUMMARY

The present disclosure provides a collision avoidance control apparatus configured to, when one of the first sensor and the second sensor detects an object, determine whether the detected object actually exists in front of the vehicle with higher accuracy than the related-art apparatus.

A collision avoidance control apparatus for a vehicle according to one embodiment includes a first sensor, a second sensor, a controller, and a memory. The first sensor is configured to, through use of an electromagnetic wave or an ultrasonic wave, detect an object present in a predetermined peripheral area of the vehicle, and acquire first detection information which is information on the detected object. The second sensor is configured to capture a predetermined peripheral range of the vehicle to acquire image data, detect an object present in the peripheral range through use of the image data, and acquire second detection information which is information on the detected object. The controller is configured to determine whether or not there is an obstacle which is an object which is likely to collide with the vehicle based on first object information, second object information, and third object information. The first object information is information obtained by integrating the first detection information on a specific object and the second detection information on the specific object. The specific object is an object which has been detected by both of the first sensor and the second sensor. The second object information is the first detection information on an object which has been detected by the first sensor and has not been detected by the second sensor. The third object information is the second detection information on an object which has been detected by the second sensor and has not been detected by the first sensor. The controller is further configured to, when determining that there is the obstacle, execute first collision avoidance control including at least braking force control for applying a braking force to wheels of the vehicle. The memory is configured to, when the specific object has been detected by both of the first sensor and the second sensor, record information on the detected specific object.

Further, the controller is configured to execute the first collision avoidance control when determining that there is the obstacle based on the first object information. In addition, the controller is configured to execute the first collision avoidance control when determining that there s the obstacle based on any one of the second object information and the third object information, and determining that a first condition is satisfied. The first condition is satisfied when the obstacle has been already recorded as the specific object in the memory. Furthermore, the controller is configured not to execute the first collision avoidance control when determining that there is the obstacle based on any one of the second object information and the third object information, and determining that the first condition is not satisfied.

The collision avoidance control apparatus according to this embodiment records/stores the information on the specific object (e.g., information identifying the specific object) in the memory when the specific object has been detected. Thereafter, when the controller determines that there is the obstacle based on any one of the second object information and the third object information, the controller determines whether or not the first condition is satisfied. When the first condition is satisfied, it can be estimated that there is a relatively high possibility that the obstacle actually exists because the obstacle was previously the specific object detected by both of the first sensor and the second sensor. Therefore, when the first condition is satisfied, the controller executes the first collision avoidance control. In this manner, when determining that there is the obstacle based on any one of the second object information and the third object information, the controller accurately determines whether the obstacle actually exists through use of the information recorded in the memory to thereby execute the first collision avoidance control.

On the other hand, when the first condition is not satisfied, it can be estimated that there is a relatively low possibility that the obstacle actually exists. Therefore, when the first condition is not satisfied, the controller does not execute the first collision avoidance control. Accordingly, it is possible to lower the possibility of decelerating the vehicle in an unnecessary situation (that is, a situation in which the obstacle does not actually exist).

In one aspect of the collision avoidance control apparatus, the controller is configured to select and execute any one of the first collision avoidance control and second collision avoidance control. The second collision avoidance control is control which includes alert control for alerting a driver of the vehicle and does not include the braking force control. Further, the controller is configured to execute the second collision avoidance control when determining that there is the obstacle based on any one of the second object information and the third object information, and determining that the first condition is not satisfied.

When it is determined that there is the obstacle based on any one of the second object information and the third object information, even if the first condition is not satisfied, the obstacle may actually exist. In view of this situation, the controller according to this aspect executes the second collision avoidance control. The second collision avoidance control includes the alert control, and does not include the braking force control. If the obstacle actually exists, since the driver is alerted, it is possible to reduce the possibility of a collision of the vehicle with the obstacle. On the other hand, even if the second collision avoidance control is executed in a situation in which the obstacle does not actually exist, the vehicle is not decelerated. Therefore, it is possible to reduce the degree of discomfort felt by the driver compared to the case where the first collision avoidance control is executed.

In one aspect of the collision avoidance control apparatus, the controller is configured to execute the second collision avoidance control when determining that there is the obstacle based on the second object information, and determining that the first condition is not satisfied. Further, the controller is configured not to execute the second collision avoidance control when determining that there is the obstacle based on the third object information, and determining that the first condition is not satisfied.

The accuracy with which the second sensor detects an object by using the image data may be lower than the accuracy with which the first sensor detects an object by using the electromagnetic wave or the ultrasonic wave. Therefore, the controller according to this aspect does not execute the second collision avoidance control when determining that there is the obstacle based on the third object information, and determining that the first condition is not satisfied. Accordingly, it is possible to lower the possibility of alerting the driver in an unnecessary situation (that is, a situation in which the obstacle does not actually exist).

In one aspect of the collision avoidance control apparatus, the apparatus further includes a vehicle speed sensor configured to detect a traveling speed of the vehicle, and an accelerator pedal operation amount sensor configured to detect an operation amount of an accelerator pedal of the vehicle. The controller is configured to determine whether or not a second condition is satisfied. The second condition is satisfied when the traveling speed is lower than a predetermined speed threshold and the operation amount of the accelerator pedal is equal to or larger than a predetermined operation amount threshold. Further, the controller is configured to execute the first collision avoidance control when determining that there is the obstacle based on any one of the second object information and the third object information, and determining that the first condition and the second condition are satisfied.

When the second condition is satisfied, this means that, although the vehicle is traveling at a low speed, the driver is stepping on the accelerator pedal strongly. In this case, it is considered that there is a high possibility that the driver is mistakenly stepping on the accelerator pedal instead of a brake pedal. In such a situation, the controller according to this aspect executes the first collision avoidance control. Therefore, it is possible to increase the possibility of avoiding a collision of the vehicle with the obstacle.

In one aspect of the collision avoidance control apparatus, the apparatus further includes a vehicle speed sensor configured to detect a traveling speed of the vehicle, and an accelerator pedal operation amount sensor configured to detect an operation amount of an accelerator pedal of the vehicle. The controller is configured to determine whether or not a second condition is satisfied. The second condition is satisfied when the traveling speed is lower than a predetermined speed threshold and the operation amount of the accelerator pedal is equal to or larger than a predetermined operation amount threshold. Further, the controller is configured to execute the first collision avoidance control when determining that there is the obstacle based on any one of the second object information and the third object information, and determining that the first condition and the second condition are satisfied. In addition, the controller is configured to execute the second collision avoidance control when determining that there is the obstacle based on any one of the second object information and the third object information, and determining that the first condition is not satisfied and the second condition is satisfied.

As described above, when the second condition is satisfied, there is a high possibility that the driver is mistakenly stepping on the accelerator pedal instead of the brake pedal. In such a situation, when determining that there is the obstacle based on any one of the second object information and the third object information, the controller according to this aspect selects and executes any one of the first collision avoidance control and the second collision avoidance control depending on whether or not the first condition is satisfied. As described above, when the first condition is satisfied, there is a relatively high possibility that the obstacle actually exists. Therefore, the controller according to this aspect executes the first collision avoidance control. Since the vehicle is decelerated, it is possible to increase the possibility of avoiding a collision of the vehicle with the obstacle.

On the other hand, when the first condition is not satisfied, there is a relatively low possibility that the obstacle actually exists. Therefore, the controller according to this aspect executes the second collision avoidance control. If the obstacle actually exists, since the driver is alerted, it is possible to reduce the possibility of a collision of the vehicle with the obstacle. On the other hand, even if the second collision avoidance control is executed in a situation in which the obstacle does not actually exist, the vehicle is not decelerated. Therefore, it is possible to reduce the degree of discomfort felt by the driver compared to the case where the first collision avoidance control is executed.

In one aspect of the collision avoidance control apparatus, the controller is configured to execute the second collision avoidance control when determining that there is the obstacle based on the second object information, and determining that the first condition is not satisfied and the second condition is satisfied. Further, the controller is configured not to execute the second collision avoidance control when determining that there is the obstacle based on the third object information, and determining that the first condition is not satisfied and the second condition is satisfied.

As described above, the accuracy with which the second sensor detects an object by using the image data may be lower than the accuracy with which the first sensor detects an object by using the electromagnetic wave or the ultrasonic wave. Therefore, the controller according to this aspect does not execute the second collision avoidance control when determining that there is the obstacle based on the third object information, and determining that the first condition is not satisfied and the second condition is satisfied. Accordingly, it is possible to lower the possibility of alerting the driver in an unnecessary situation (that is, a situation in which the obstacle does not actually exist).

According to one or more embodiments, the above-mentioned memory includes a readable and writable recording/storage medium such as a random access memory (RAM), a flash memory, and the like. According to one or more embodiments, the above-mentioned controller is implemented by a microprocessor programmed for performing one or more operations and/or functionality described herein. In addition, the controller may be implemented, in whole or in part, by specifically configured to hardware (e.g., by one or more application specific integrated circuits or ASIC(s)).

Further features relating to the present disclosure become apparent from the description herein and the accompanying drawings. Problems, configurations, and effects other than those described above become apparent from the following description of embodiments.

In the above description, in order to facilitate understanding of the present disclosure, a name and/or reference numeral used in the embodiments described later is enclosed in parentheses and assigned to each of the constituent features corresponding to the embodiments. However, each of the constituent features is not limited to the embodiments defined by the name and/or reference numeral.

DETAILED DESCRIPTION

Now, referring to the accompanying drawings, a description is given of embodiments. The accompanying drawings are illustrations of specific embodiments, but those illustrations are examples to be used for the understanding of the embodiments, and are not to be used to limit the interpretation of the present disclosure.

First Embodiment

A collision avoidance control apparatus (hereinafter, referred to as a "first apparatus") according to a first embodiment of the present disclosure is applied to a vehicle (automobile).

Figure 1:
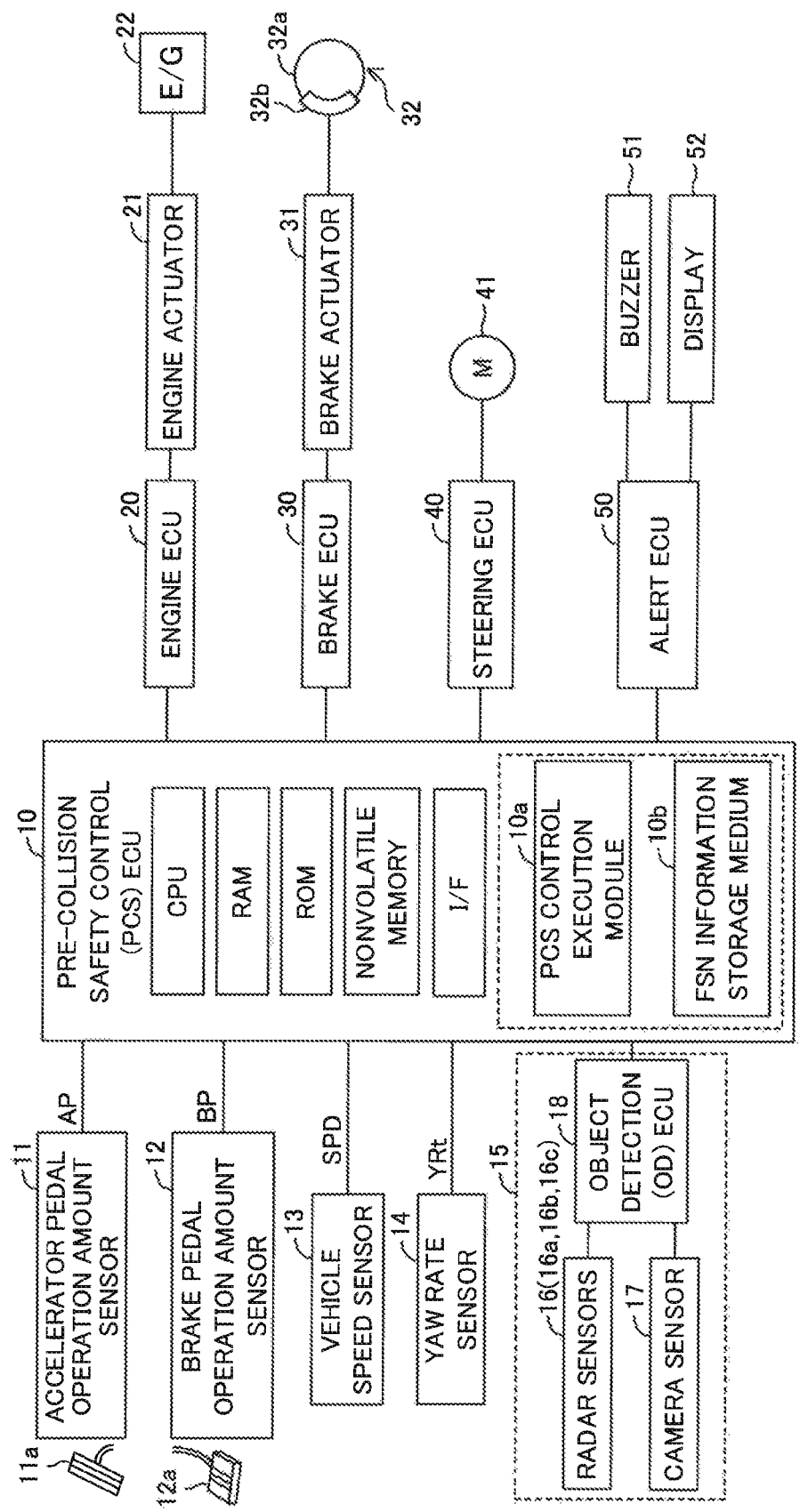
FIG. 1 is a schematic configuration diagram of a collision avoidance control apparatus (first apparatus) for a vehicle according to a first embodiment.

As illustrated in FIG. 1, the first apparatus includes a pre-collision safety control ECU 10, an engine ECU 20, a brake ECU 30, a steering ECU 40, and an alert ECU 50. Hereinafter, the pre-collision safety control ECU 10 is simply referred to as "PCS ECU 10".

The above-mentioned ECUs are electric control units each including a microcomputer as a main part, and are connected to one another so as to be able to mutually transmit and receive information via a controller area network (CAN) (not shown). The microcomputer herein includes a CPU, a RAM, a ROM, a nonvolatile memory, an interface I/F, and the like. The CPU executes instructions (programs and routines) stored in the ROM to realize various functions described later. In addition, two or more ECUs among the above-mentioned ECUs may be integrated into one ECU.

The PCS ECU 10 is electrically connected to sensors described later, and receives detection signals or output signals of the sensors, respectively. The sensors may be electrically connected to any of the ECUs other than the PCS ECU 10. In this case, the PCS ECU 10 receives the detection signals or the output signals of the sensors from the ECUs electrically connected to the sensors via the CAN.

An acceleration pedal operation amount sensor 11 detects an operation amount (accelerator opening) AP of an acceleration pedal 11a of the vehicle and outputs a detection signal or an output signal indicative of the operation amount AP to the PCS ECU 10. A brake pedal operation amount sensor 12 detects an operation amount BP of a brake pedal 12a of the vehicle, and outputs a detection signal or an output signal indicative of the operation amount BP to the PCS ECU 10.

A vehicle speed sensor 13 detects a traveling speed SPD of the vehicle and outputs a detection signal or an output signal indicative of the traveling speed SPD to the PCS ECU 10. A yaw rate sensor 14 detects a yaw rate YRt of the vehicle and outputs a detection signal or an output signal indicative of the actual yaw rate YRt to the PCS ECU 10.

Hereinafter, "information on a traveling state of the vehicle" output from the acceleration pedal operation amount sensor 11, the brake pedal operation amount sensor 12, the vehicle speed sensor 13 and the yaw rate sensor 14 will be also referred to as "traveling state information".

An ambient sensor 15 includes a plurality of radar sensors 16a, 16b and 16c, a camera sensor 17, and an object detection ECU 18. Hereinafter, the object detection ECU 18 is simply referred to as "OD ECU 18". The ambient sensor 15 is configured to acquire information on three-dimensional objects present in a peripheral region of the vehicle. The peripheral region herein includes a front region, a right side region and a left side region, as described later. The three-dimensional objects include, for example, moving objects such as pedestrians, bicycles, vehicles and the like, and motionless objects such as power poles, trees, guardrails and the like. Hereinafter, the three-dimensional object will be simply referred to as an "object". The ambient sensor 15 is configured to calculate information on an object (hereinafter referred to as "object information") to output the object information to the PCS ECU 10.

Figure 2:
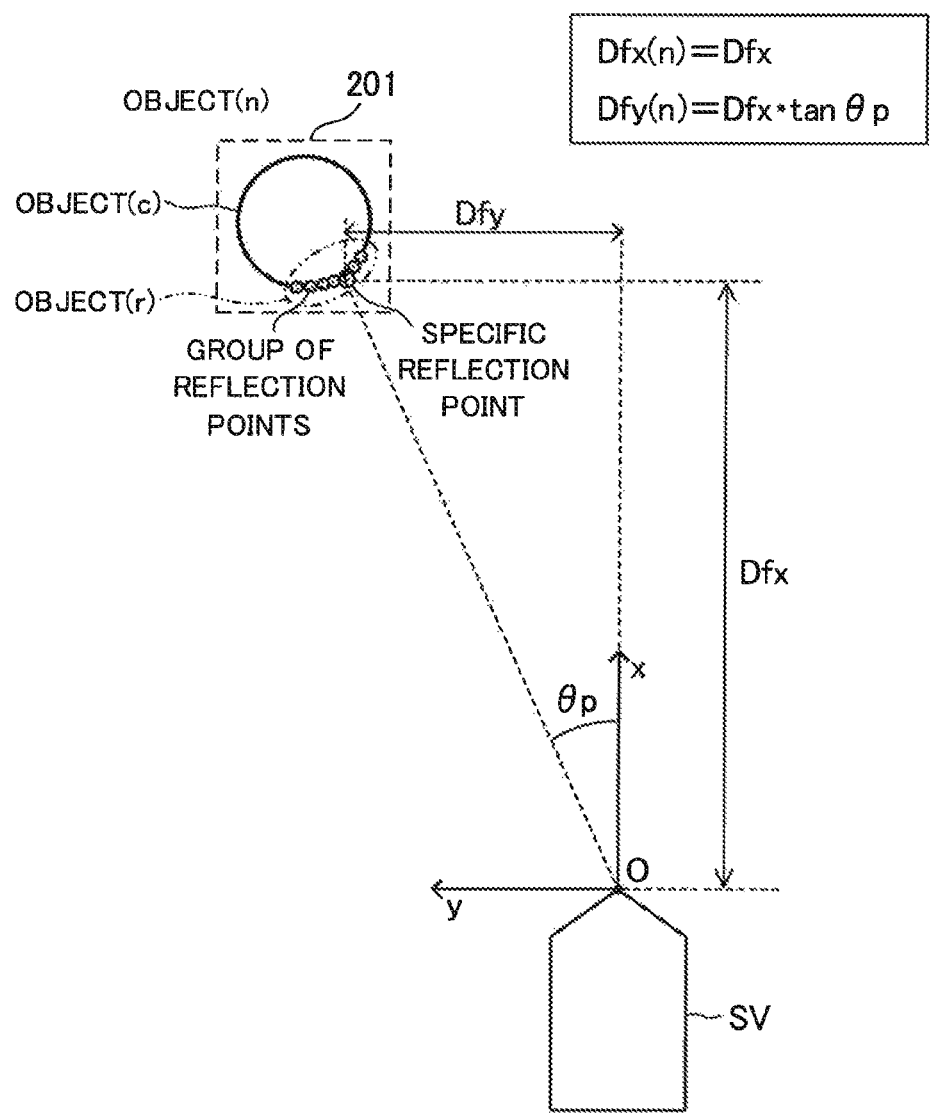
FIG. 2 is a diagram for illustrating object information (a longitudinal distance of an object, an azimuth orientation of the object, and the like) acquired by an ambient sensor illustrated in FIG. 1.

As illustrated in FIG. 2, the ambient sensor 15 acquires the object information based on a predefined x-y coordinate system. The origin of the x-y coordinate system is a center position O in a vehicle width direction of a front end portion of the vehicle SV. The x-axis is a coordinate axis which extends along a front-rear direction of the vehicle SV, and passes through the center position in the vehicle width direction of the front end portion of the vehicle SV. A positive value of the x-axis indicates a position on the front side of the origin meanwhile a negative value of the x-axis indicates a position on the rear side of the origin. The y-axis is a coordinate axis orthogonal to the x-axis. A positive value of the y-axis indicates a position on the left side of the origin meanwhile a negative value of the y-axis indicates a position on the right side of the origin. The x-coordinate position of the x-y coordinate system is referred to as a "longitudinal distance Dfx", and the y-coordinate position of the x-y coordinate system is referred to as a "lateral position Dfy".

The longitudinal distance Dfx(n) of an object (n) is a signed distance between the origin O and the object (n) in the central axis (i.e., the x-axis) direction of the vehicle SV.

The lateral position Dfy(n) of the object (n) is a signed distance between the origin O and the object (n) in a direction (i.e., the y-axis direction) perpendicular to the central axis of the vehicle SV.

A relative speed Vfx(n) of the object (n) is a difference between a speed Vs of the object (n) and a speed Vj (=SPD) of the vehicle SV (that is, Vfx(n)=Vs−Vj). The speed Vs of the object (n) is a speed of the object (n) in the central axis (x-axis) of the vehicle SV.

Figure 3:
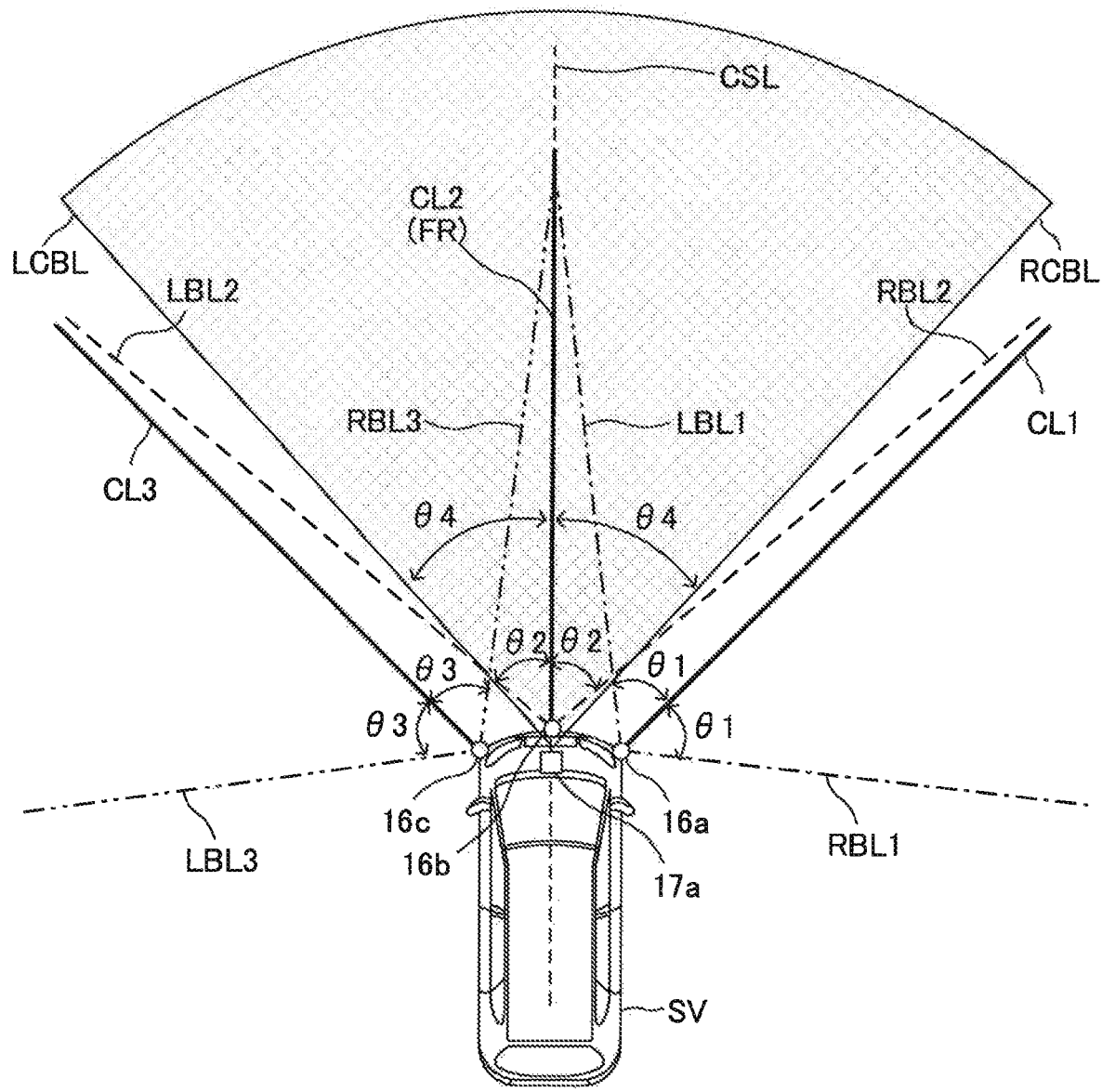
FIG. 3 is a diagram for illustrating detectable areas (detectable ranges) of radar sensors and a camera sensor illustrated in FIG. 1.

As illustrated in FIG. 3, the radar sensor 16a is disposed at a right corner portion of a front part of the vehicle SV, the radar sensor 16b is disposed at a center portion in the vehicle width direction of the front part of the vehicle SV, and the radar sensor 16c is disposed at a left corner portion of the front part of the vehicle SV. The radar sensors 16a, 16b and 16c are collectively referred to as "radar sensors 16" unless it is required to distinguish between those sensors. In addition, the radar sensors 16 may be referred to as "first sensors".

Each of the radar sensors 16 includes a radar transceiver (radar transmitting/receiving part) (not shown) and an information processor (not shown). The radar transceiver radiates an electromagnetic wave (e.g., radio wave in a millimeter waveband). Hereinafter, the radio wave in the millimeter waveband is simply referred to as a "millimeter wave". The radar transceiver receives a millimeter wave (i.e., reflected wave) reflected by an object (three-dimensional object) present within a radiation range. In addition, the radar sensors 16 may be radar sensors configured to radiate and receive a radio wave in a frequency band other than the millimeter waveband.

The information processor detects an object based on reflection point information. The reflection point information includes a phase difference between the transmitted millimeter wave and the received reflected wave, an attenuation level of the reflected wave, a time period required from transmission of the millimeter wave to reception of the reflected wave, and other information. The information processor groups "a plurality of reflection points of millimeter waves" which are close to each other, and detects the grouped reflection points (hereinafter referred to as a "group of reflection points") as one object. The information processor assigns an object ID, which is identification information for identifying an object, to the detected object. Furthermore, the information processor acquires (calculates) radar-sensor detection information on the detected object based on the reflection point information. The radar-sensor detection information includes the longitudinal distance Dfx of the object, an azimuth orientation Op of the object with respect to the vehicle SV, the relative speed Vfx between the object and the vehicle SV, and other information. As illustrated in FIG. 2, the information processor calculates the radar-sensor detection information by using a point (specific reflection point) in the group of reflection points. The radar-sensor detection information may be referred to as "first detection information".

As illustrated in FIG. 3, an area (detectable area) in which the radar sensor 16a can detect an object is a fan-shaped area having a detection axis CL1 as a central axis extending from the right corner portion of the front part of the vehicle SV in a front-right direction. The fan-shaped area includes an area from the detection axis CL1 to the right side to a right boundary line RBL1, and an area from the detection axis CL1 to the left side to a left boundary line LBL1. A radius of the fan-shaped area is a specific distance. An "angle between the detection axis CL1 and the right boundary line RBL1" and an "angle between the detection axis CL1 and the left boundary line LBL1" are "θ1". Thus, a central angle of the fan-shaped area which is the detectable area of the radar sensor 16a is "2·θ1". The radar sensor 16a detects an object present in the right side region of the vehicle SV, and obtains (calculates) the radar-sensor detection information on the detected object.

A detectable area of the radar sensor 16b is a fan-shaped area having a detection axis CL2 as a central axis extending from the center portion in the vehicle width direction of the front part of the vehicle SV in the front direction. The fan-shaped area includes an area from the detection axis CL2 to the right side to a right boundary line RBL2, and an area from the detection axis CL2 to the left side to a left boundary line LBL2. A radius of the fan-shaped area is the above-mentioned specific distance. The detection axis CL2 overlaps a longitudinal axis FR of the vehicle SV. An "angle between the detection axis CL2 and the right boundary line RBL2" and an "angle between the detection axis CL2 and the left boundary line LBL2" are "θ2". Thus, a central angle of the fan-shaped area which is the detectable area of the radar sensor 16b is "2·θ2". The radar sensor 16b detects an object present in the front region of the vehicle SV, and obtains (calculates) the radar-sensor detection information on the detected object.

A detectable area of the radar sensor 16c is a fan-shaped area having a detection axis CL3 as a central axis extending from the left corner portion of the front part of the vehicle SV in a front-left direction. The fan-shaped area includes an area from the detection axis CL3 to the right side to a right boundary line RBL3, and an area from the detection axis CL3 to the left side to a left boundary line LBL3. A radius of the fan-shaped area is the above-mentioned specific distance. An "angle between the detection axis CL3 and the right boundary line RBL3" and an "angle between the detection axis CL3 and the left boundary line LBL3" are "θ3". Thus, a central angle of the fan-shaped area which is the detectable area of the radar sensor 16c is "2·θ3". The radar sensor 16c detects an object present in the left side region of the vehicle SV, and obtains (calculates) the radar-sensor detection information on the detected object.

The camera sensor 17 includes a camera and an image processor. The camera is a monocular camera. The camera may be a stereo camera. The camera sensor 17 may be referred to as a "second sensor".

As illustrated in FIG. 3, a camera 17a is disposed at a central position of the front part of the vehicle SV. The camera 17a captures an image of a predetermined range (front range of the vehicle SV) in surroundings of the vehicle SV to acquire image data. A detectable area of the camera sensor 17 is a fan-shaped area having a detection axis CSL as a central axis extending from the central position of the front part of the vehicle SV in the front direction. The fan-shaped area includes an area from the detection axis CSL to the right side to a right boundary line RCBL, and an area from the detection axis CSL to the left side to a left boundary line LCBL. The detection axis CSL overlaps the longitudinal axis FR of the vehicle SV. An "angle between the detection axis CSL and the right boundary line RCBL" and an "angle between the detection axis CSL and the left boundary line LCBL" are "θ4". Thus, an angle of view of the camera 17a is "2·θ4".

The image processor detects an object present in the predetermined range (captured range) based on the acquired image data. When the image processor detects an object, the image processor acquires (calculates) camera-sensor detection information on the detected object. The camera-sensor detection information includes the longitudinal distance Dfx of the object, the azimuth orientation θp of the object with respect to the vehicle SV, the relative speed Vfx between the object and the vehicle SV, and other information. The camera-sensor detection information may be referred to as "second detection information".

The OD ECU 18 is connected to be able to communicate with the information processor of each of the radar sensors and the image processor of the camera sensor 17. The OD ECU 18 receives the radar-sensor detection information and the camera-sensor detection information. The OD ECU 18 determines (obtains) the object information on the object (n) through use of one or both of the radar-sensor detection information and the camera-sensor detection information as described below. The object information includes the object ID, the longitudinal distance Dfx(n), the lateral position Dfy(n), the relative speed Vfx(n), a time at which the object (n) has been detected, and the like. The OD ECU 18 transmits the determined object information on the object (n) to the PCS ECU 10 each time a predetermined time elapses.

Hereinafter, an object detected (specified) by the camera-sensor detection information is referred to as an "object (c)", and an object detected (specified) by the radar-sensor detection information is referred to as an "object (r)". When the OD ECU 18 acquires (receives) both of the radar-sensor detection information and the camera-sensor detection information, the OD ECU 18 defines an object region 201 indicative of a region where the object (c) is present as illustrated in FIG. 2. The object region 201 is a region in the above-mentioned x-y coordinate system, and is a region surrounding the object (c). Next, the OD ECU 18 determines whether or not at least a part of the group of reflection points corresponding to the object (r) is included in the object region 201. When at least a part of the group of reflection points corresponding to the object (r) is included in the object region 201, the OD ECU 18 treats the object (c) detected based on the camera-sensor detection information and the object (r) detected based on the radar-sensor detection information as the same object (n). The object detected by both of the radar-sensor detection information and the camera-sensor detection information may be referred to as a "specific object detected by both of the sensors". The OD ECU 18 determines the (final) object information on the object (n) by integrating the radar-sensor detection information and the camera-sensor detection information as described below. Such integrating processing may be referred to as "fusion processing".

As illustrated in FIG. 2, the OD ECU 18 adopts the longitudinal distance Dfx included in the radar-sensor detection information as a final longitudinal distance Dfx(n) of the object (n). Further, the OD ECU 18 calculates a final lateral position Dfy(n) of the object (n) based on the longitudinal distance Dfx included in the radar-sensor detection information and the azimuth orientation θp included in the camera-sensor detection information. Specifically, the OD ECU 18 obtains the final lateral position Dfy(n) in accordance with the following Expression: Dfy(n)="Dfx"×"tan θp". Furthermore, the OD ECU 18 adopts, as a final relative speed Vfx(n) of the object (n), the relative speed included in the radar-sensor detection information. The OD ECU 18 assigns the same object ID to the object (n) detected based on the radar-sensor detection information and the object (n) detected based on the camera-sensor detection information. Hereinafter, the "object information determined based on both of the radar-sensor detection information and the camera-sensor detection information" as described above may be referred to as "two-sensor object information (or first object information)". Therefore, when the OD ECU 18 detects the object (n) based on both of the radar-sensor detection information and the camera-sensor detection information, the OD ECU 18 determines the two-sensor object information as the object information of the object (n), and transmits the determined object information to the PCS ECU 10.

Meanwhile, when the OD ECU 18 detects the object (n) based on one of the radar-sensor detection information and the camera-sensor detection information, the OD ECU 18 acquires (determines) the final object information based on only the detected information. In this case, the OD ECU 18 assigns the object ID to the object (n) so as not to overlap with the existing object ID. Hereinafter, the "object information determined based on only one of the radar-sensor detection information and the camera-sensor detection information" as described above may be referred to as "single-sensor object information". Therefore, when the OD ECU 18 detects the object (n) based on only one of the radar-sensor detection information and the camera-sensor detection information, the OD ECU 18 transmits the single-sensor object information to the PCS ECU 10 as the object information of the object (n).

Hereinafter, the "object information determined based on only the radar-sensor detection information" may be referred to as "radar-sensor object information (or second object information)". In other words, the radar-sensor object information is the object information on an object which has been detected by the radar sensor(s) 16 and has not been detected by the camera sensor 17. In addition, the "object information determined based on only the camera-sensor detection information" may be referred to as "camera-sensor object information (or third object information)". In other words, the camera-sensor object information is the object information on an object which has not been detected by the radar sensors 16 and has been detected by the camera sensor 17.

As described later, a situation may occur in which an object (n) is detected based on both of the radar-sensor detection information and the camera-sensor detection information, and then, that object (n) is detected based on only one of the radar-sensor detection information and the camera-sensor detection information. In such a situation, the OD ECU 18 assigns to the object (n) the object ID assigned at the time point at which the radar-sensor detection information and the camera-sensor detection information have been integrated through the integrating processing (fusion processing) as it is. That is, while the object (n) is continuously detected based on at least one of the radar-sensor detection information and the camera-sensor detection information, the same object ID is assigned to the object (n).

Further, the same processing is executed when the following situation occurs. A situation may occur in which an object (n) is detected based on only one of the radar-sensor detection information and the camera-sensor detection information, and then, that object (n) is detected based on both of the radar-sensor detection information and the camera-sensor detection information. In such a situation, the OD ECU 18 assigns to the object (n) the object ID assigned at the time point at which the object (n) has been detected based on only one of the radar-sensor detection information and the camera-sensor detection information as it is.

Referring again to FIG. 1, the engine ECU 20 is electrically connected to an engine actuator 21. The engine actuator 21 includes a throttle valve actuator configured to change an opening degree of a throttle valve of a spark ignition, gasoline fuel injection engine 22. The engine ECU 20 is capable of changing a torque to be generated by the engine 22 by driving the engine actuator 21. A torque generated by the engine 22 is transmitted to drive wheels (not shown) via a transmission (not shown). Thus, the engine ECU 20 is capable of controlling the activation of the engine actuator 21 to control a driving force of the vehicle to thereby change an acceleration or an acceleration state. When the vehicle is a hybrid vehicle, the engine ECU 20 is capable of controlling a driving force of the vehicle to be generated by any one of or both of "an engine and a motor" serving as vehicle driving sources. Further, when the vehicle is an electric vehicle, the engine ECU 20 is capable of controlling a driving force of the vehicle to be generated by a motor serving as a vehicle driving source.

The brake ECU 30 is electrically connected to a brake actuator 31. The brake actuator 31 is provided in a hydraulic circuit provided between a master cylinder (not shown) for pressurizing hydraulic oil by a depression force of the brake pedal 12*a* and a friction brake mechanism 32 provided in wheels (i.e., right and left front and rear wheels) of the vehicle. The brake actuator 31 adjusts a hydraulic pressure supplied to a wheel cylinder (not shown) in each brake caliper 32*b* of the friction brake mechanism 32, depending on a command sent from the brake ECU 30. The wheel cylinder is activated by the hydraulic pressure to press a brake pad (not shown) on the brake disc 32*a*, thereby to generate a friction braking force on the brake disc 32*a*. Therefore, the brake ECU 30 is capable of controlling the activation of the brake actuator 31 to control a braking force applied to the vehicle to thereby change an acceleration or an acceleration state (or deceleration, that is, negative acceleration).

The steering ECU 40 is electrically connected to an assist motor (M) 41. The assist motor 41 is integrated into a "steering mechanism including a steering wheel, a steering shaft coupled to the steering wheel, and a gear mechanism for steering" (not shown) of the vehicle. The steering ECU 40 uses a steering torque sensor (not shown) provided in the steering shaft to detect a steering torque input to the steering wheel by the driver, to thereby drive the assist motor 41 based on the steering torque. The steering ECU 40 applies a steering torque (steering assist torque) to the steering mechanism through the drive of the assist motor 41 to thereby assist a steering operation of the driver.

The alert ECU 50 is electrically connected to a buzzer 51 and a display 52. The alert ECU 50 causes the buzzer 51 to output/utter an "alerting sound for alerting the driver that there is an object having a high possibility of a collision with the vehicle SV" in accordance with a command from the PCS ECU 10. Further, the alert ECU 50 displays a mark/indicator (e.g., warning lamp) for alerting the driver on the display 52 in accordance with a command from the PCS ECU 10.

<Summary of Pre-Collision Safety Control>

When there is an object (obstacle) which is likely to collide with the vehicle SV, the PCS ECU 10 is configured to execute well-known pre-collision safety control (collision avoidance control) for avoiding a collision with the object. Hereinafter, the pre-collision safety control is simply referred to as "PCS control".

Specifically, PCS ECU 10 receives the object information from the OD ECU 18, and recognizes objects present in the peripheral region of the vehicle SV based on the object information. Next, the PCS ECU 10 extracts from among the recognized objects an object (n) that may collide with the vehicle, based on the traveling direction of the vehicle SV and the moving directions of those recognized objects. For example, the extracted object is present in an area (e.g., area in front of the vehicle SV) where there is a possibility of collision with the vehicle SV. Then, the PCS ECU 10 estimates a collision prediction time TTC (Time To Collision) required for the object (n) to collide with the vehicle SV based on the distance Dfx (n) to the object (n) and the relative velocity Vfx (n). The collision prediction time TTC is calculated by dividing the distance Dfx (n) by the relative velocity Vfx (n). When the collision prediction time TTC is equal to or shorter than a predetermined time threshold Tth, the object (n) is determined as an obstacle having a high possibility of colliding with the vehicle SV. When the PCS ECU 10 determines that there is an object (obstacle) having a high possibility of colliding with the vehicle SV, the PCS ECU 10 executes the PCS control. The PCS control includes a first PCS control and a second PCS control. The contents of the first PCS control and the second PCS control will be described below.

(First PCS Control)

When the collision prediction time TTC is equal to or shorter than the time threshold Tth, and there is a relatively high possibility that the object (n) actually exists, the PCS ECU 10 executes the first PCS control. The first PCS control includes braking force control for applying the braking force to the wheels, driving force suppression control for suppressing the driving force of the vehicle, and alerting control for alerting the driver. Specifically, the PCS ECU 10 transmits a braking instruction signal to the brake ECU 30. Upon receiving the braking instruction signal from the PCS ECU 10, the brake ECU 30 controls the brake actuator 31 to apply the braking force to the wheels so that the actual acceleration of the vehicle SV matches (becomes equal to) a target deceleration TG included in the braking instruction signal. Further, the PCS ECU 10 transmits a drive instruction signal to the engine ECU 20. Upon receiving the drive instruction signal from the PCS ECU 10, the engine ECU 20 controls the engine actuator 21 to suppress the driving force of the vehicle so that the actual acceleration of the vehicle SV matches (becomes equal to) a target acceleration AG (for example, zero) included in the drive instruction signal. In addition, the PCS ECU 10 transmits an alert instruction signal to the alert ECU 50. Upon receiving the alert instruction signal from the PCS ECU 10, the alert ECU 50 causes the buzzer 51 to output/utter the alerting sound and displays the mark for alerting the driver on the display 52.

(Second PCS Control)

When the collision prediction time TTC is equal to or shorter than the time threshold Tth, and there is a relatively low possibility that the object (n) actually exists, the PCS ECU 10 executes the second PCS control. In the present example, the second PCS control includes only the alerting control. The PCS ECU 10 causes the buzzer 51 to output the alerting sound and displays the alerting mark on the display 52 through the alert ECU 50 as described above.

As described above, the PCS ECU 10 includes a "PCS control execution module 10a configured to execute the PCS control" implemented by the CPU in terms of function (see FIG. 1).

<Outline of Operation>

Next, an outline of the operation of the first apparatus will be described. In the ambient sensor 15, a specific situation may occur in which one of the above two types of the sensors (i.e., the radar sensors 16 or the camera sensor 17) detects an object meanwhile the other one of those types does not detect that object. Examples of the specific situation include a situation in which an object actually exists, and a situation in which an object does not actually exist as described below.

In one example, a situation may occur in which one or more of the radar sensors 16 detects an object accurately meanwhile the camera sensor 17 does not detect that object due to misrecognition. In another example, a situation may occur in which the camera sensor 17 detects an object accurately meanwhile the radar sensors 16 do not detect that object because the group of reflection points cannot be obtained accurately. In those cases, one of the two types of the sensors cannot detect an object despite the fact that the object actually exists.

Further, as illustrated in FIG. 3, the total range that combines all the detectable areas of the radar sensors 16 is larger than the detectable area of the camera sensor 17. Therefore, although an object exists within the detectable area of one of the radar sensors 16, that object may not exist within the detectable area of the camera sensor 17. In this case, although one of the radar sensors 16 detects the object, the camera sensor 17 cannot detect the object. Thus, in a situation in which the object actually exists, one of the two types of the sensors may not detect the object. In consideration of the above, when an object is detected based on the single-sensor object information, if other conditions (for example, the collision prediction time TTC is equal to or shorter than the time threshold Tth) are satisfied, the PCS ECU 10 may be better to execute the PCS control.

On the other hand, the radar sensors 16 may detect an object (also referred to as "ghost object") that does not actually exist, due to multiple reflections of the transmitted millimeter waves and/or the reflected waves from the object. In another example, the camera sensor 17 may erroneously recognize an object that does not actually exist. Thus, when an object is detected based on the single-sensor object information, the PCS ECU 10 may execute the PCS control in an unnecessary situation (that is, a situation in which an object does not exist).

In view of the above, when the PCS ECU 10 of the first apparatus detects/recognizes an object based on the two-sensor object information, the PCS ECU 10 stores in the RAM information on the detected/recognized object (hereinafter, referred to as a "fusion object") as "fusion object record information 400" illustrated in FIG. 4.

The fusion object record information 400 is information on an object which was recognized as the fusion object in the past. The object recorded in the fusion object record information 400 is an object which was recognized based on the two-sensor object information, and therefore, there is a high possibility that the object actually exists. Hereinafter, the fusion object record information 400 is simply referred to as "FSN information 400".

The FSN information 400 includes an object ID 401 and a detection time 402 as table items. The object ID 401 is identification information for identifying/distinguishing an object, as described above. The detection time 402 is the time when the object corresponding to the object ID 401 has been first detected/recognized. As described above, the PCS ECU 10 includes an "FSN information storage medium 10b configured to store the FSN information" implemented by the RAM (and/or the nonvolatile memory) in terms of function (see FIG. 1).

When the PCS ECU 10 recognizes an object based on the single-sensor object information, the PCS ECU 10 refers to the FSN information 400. When the object recognized based on the single-sensor object information is an object recorded/stored as the fusion object in the FSN information 400, there is a high possibility that the recognized object actually exists. Therefore, when the object recognized based on the single-sensor object information is an object (fusion object) recorded in the FSN information 400, the PCS ECU 10 executes the first PCS control. Therefore, it is possible to reliably reduce the possibility that the vehicle SV collides with the object.

On the other hand, when the object recognized based on the single-sensor object information is not an object (fusion object) recorded in the FSN information 400, there is a low possibility that the recognized object actually exists. In this case, the PCS ECU 10 executes the second PCS control. As described above, the second PCS control is control for outputting the alerting sound and displaying the alerting mark. Even if the second PCS control is executed in a situation in which an object does not actually exist, the degree of discomfort felt by the driver is lower than when the first PCS control is executed. Furthermore, if an object actually exists, the possibility of the vehicle SV colliding with the object can be reduced.

According to the above configuration, when the PCS ECU 10 recognizes an object based on the single-sensor object information, the PCS ECU 10 refers to the FSN information 400 to thereby accurately determine whether or not the recognized object actually exists in the peripheral region of the vehicle SV. Further, only in a situation in which it can be estimated that there is a high possibility that the object actually exists, the PCS ECU 10 executes the first PCS control. Therefore, it is possible to reduce the possibility that the first PCS control is executed an unnecessary situation (that is, a situation in which the recognized object does not exist).

<Operation>

Next, the operation of the first apparatus will be described. The CPU (hereinafter simply referred to as "CPU") of the PCS ECU 10 is configured to execute each of the routines illustrated in FIGS. 5 and 6 each time a predetermined time elapses. Furthermore, each time a predetermined time elapses, the CPU executes a routine (not shown) to acquire the single-sensor object information and the two-sensor object information from the OD ECU 18, and store those pieces of information in the RAM.

Figure 5:
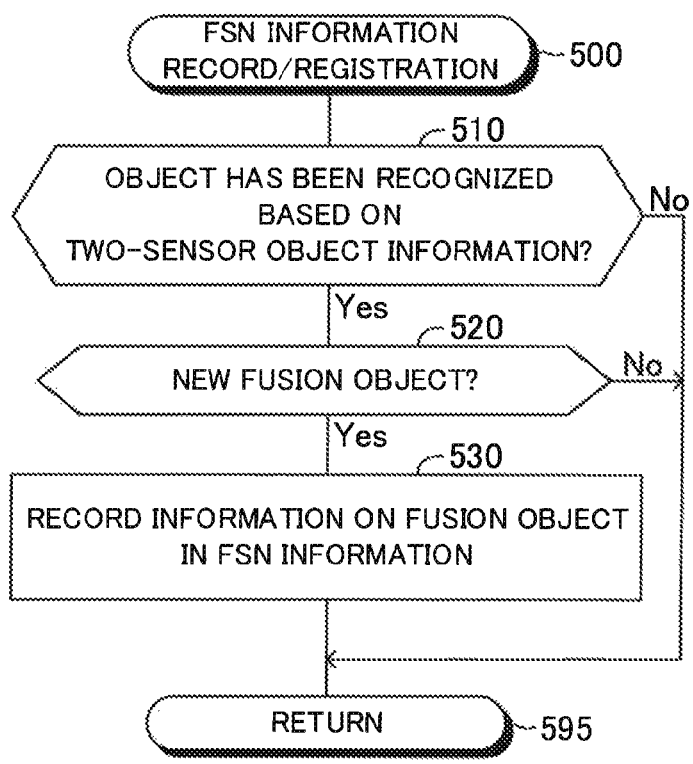
FIG. 5 is a flowchart for illustrating an "FSN information record/registration routine" to be executed by a pre-collision safety control ECU (PCS ECU) in the first apparatus.

When a predetermined timing is reached, the CPU starts the processing from Step 500 of FIG. 5, and proceeds to Step 510. In Step 510, the CPU determines whether or not an object has been recognized based on the two-sensor object information. When no object has been recognized based on the two-sensor object information, the CPU makes a "No" determination in Step 510, and proceeds directly to Step 595 to tentatively terminate this routine.

Figure 7:
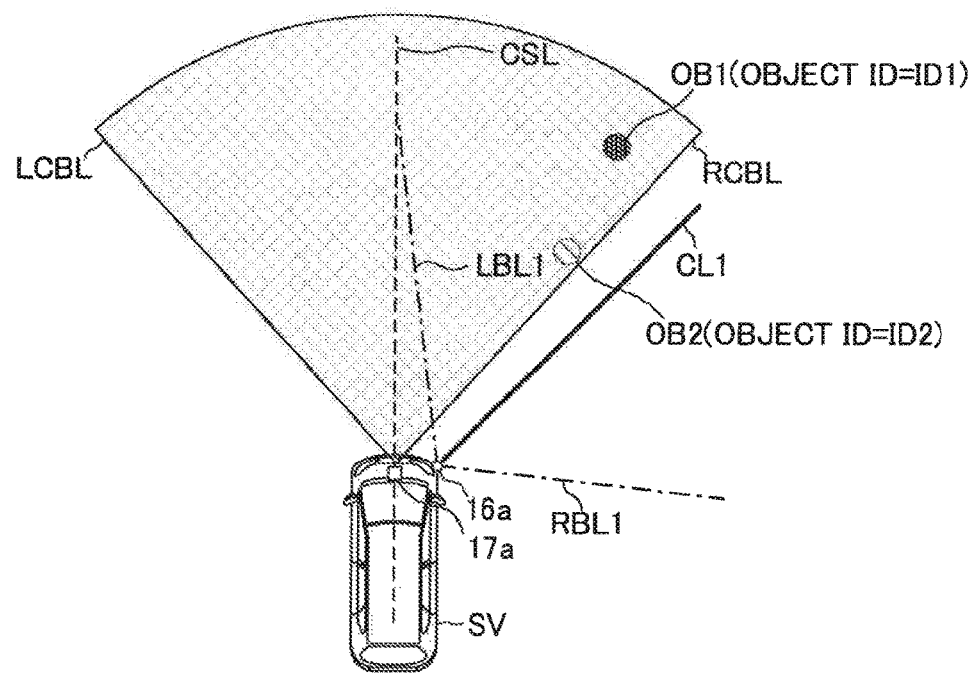
FIG. 7 is a diagram for illustrating a "relationship between positions of objects, and the detectable areas of the radar sensor and the camera sensor" at a time point (first time point).

On the other hand, as illustrated in FIG. 7, it is assumed that, at a current time point (hereinafter, referred to as a "first time point"), an object OB1 and an object OB2 both exist within the detectable area of the radar sensor 16a and within the detectable area of the camera sensor 17. The object OB1 and the object OB2 are moving objects (pedestrians), respectively. In FIG. 7, in order to simplify the drawing, only the detectable area of the radar sensor 16a and the detectable area of the camera sensor 17 are illustrated, and the detectable areas of the radar sensors 16b and 16c are omitted.

In this situation, the CPU has recognized the object OB1 and the object OB2 as the fusion objects, respectively, based on the two-sensor object information. Here, the object ID of the object OB1 is "ID1", and the object ID of the object OB2 is "ID2". The CPU makes a "Yes" determination in Step 510, and proceeds to Step 520 to determine whether or not the object OB1 and the object OB2 are new fusion objects, respectively. That is, the CPU determines whether or not the object OB1 and the object OB2 are objects which have been already stored in the FSN information 400, respectively.

Specifically, the CPU determines whether or not the object ID of the object OB1 and the object ID of the object OB2 have been already recorded/registered in the object ID 401 of the FSN information 400, respectively. When the object ID of the object OB1 and the object ID of the object OB2 have been already recorded in the object ID 401 of the FSN information 400, the CPU makes a "No" determination in Step 520, and proceeds directly to Step 595 to tentatively terminate this routine.

It is now assumed that the object ID of the object OB1 and the object ID of the object OB2 have not yet been recorded in the object ID 401 of the FSN information 400. In this case, the CPU makes a "Yes" determination in Step 520, and proceeds to Step 530. In Step 530, the CPU records/registers information (the object ID and the detection time) on the object OB1 and the object OB2 in the FSN information 400 (see FIG. 4). Next, the CPU proceeds to Step 595 to tentatively terminate this routine. In another situation, if only the object ID of the object OB1 has not yet recorded in the object ID 401 of the FSN information 400 from among the object IDs of the object OB1 and the object OB2, the CPU proceeds to Step 530 to newly record information (the object ID and the detection time) on the object OB1 in the FSN information 400.

Figure 6:
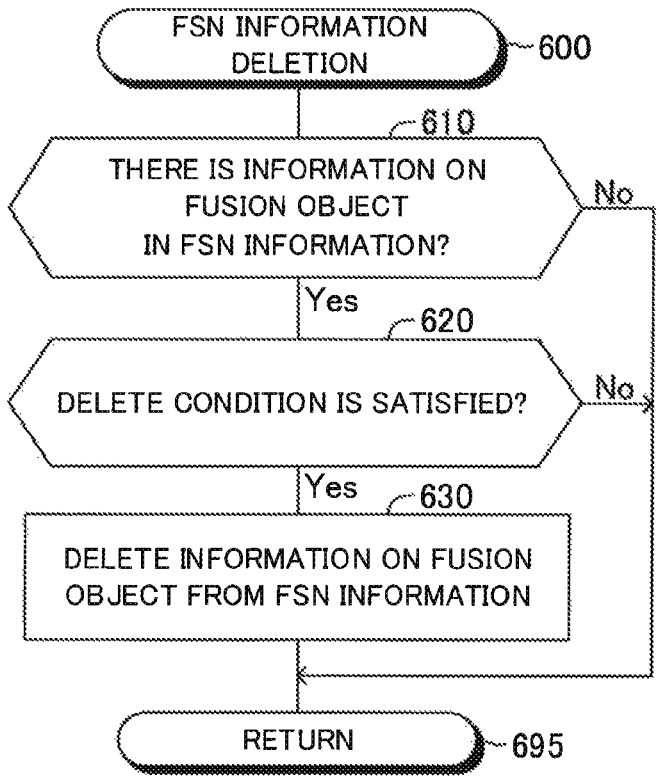
FIG. 6 is a flowchart for illustrating an "FSN information deletion routine" to be executed by the PCS ECU in the first apparatus.

When a predetermined timing is reached, the CPU starts the processing from Step 600 of FIG. 6, and proceeds to Step 610. In Step 610, the CPU determines whether or not there is information on the fusion object in the FSN information 400. When there is no information on the fusion object in the FSN information 400, the CPU makes a "No" determination in Step 610, and proceeds directly to Step 695 to tentatively terminate this routine.

Figure 4:
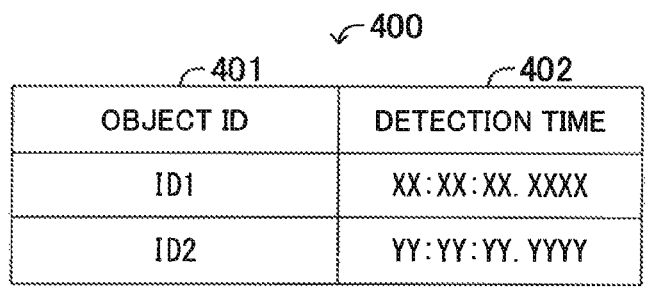
FIG. 4 is a diagram for illustrating a fusion object record information (FSN information).

It is assumed that the FSN information 400 is in the state illustrated in FIG. 4. In this case, the CPU makes a "Yes" determination in Step 610, and proceeds to Step 620 to determine whether or not a predetermined deletion condition is satisfied. The deletion condition is satisfied when, among the fusion objects recorded in the FSN information 400, at least one object cannot be recognized at the present time. Specifically, the deletion condition is satisfied when the following Condition A is satisfied.

(Condition A) Among the fusion objects recorded in the FSN information 400, there is at least one object which cannot be recognized not only based on the "two-sensor object information" but also the "single-sensor object information".

When Condition A is not satisfied, the CPU makes a "No" determination in Step 620, and proceeds directly to Step 695 to tentatively terminate this routine.

Figure 8:
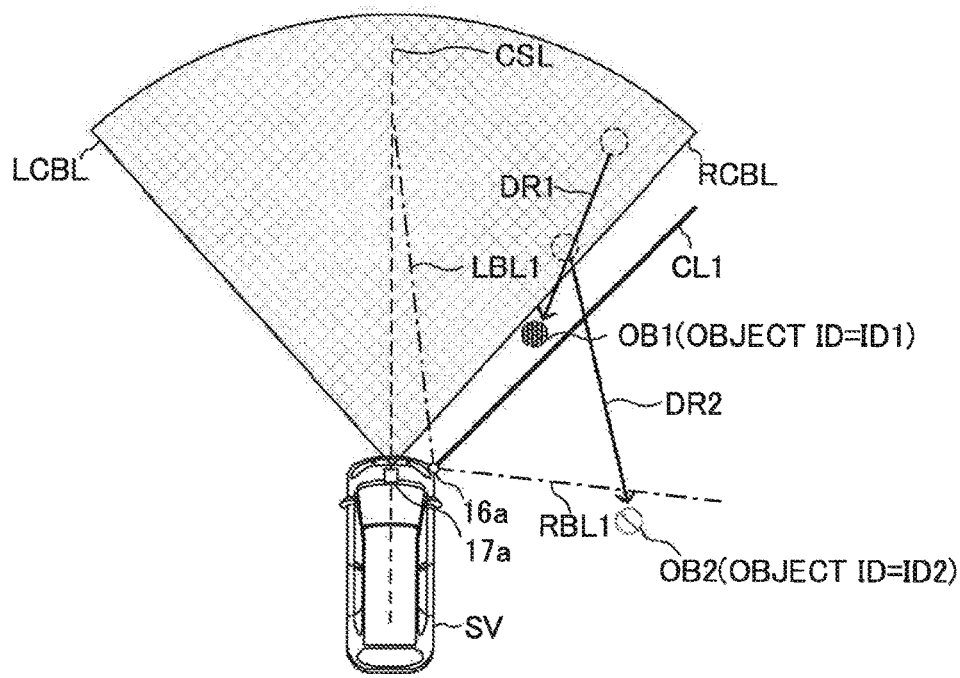
FIG. 8 is a diagram for illustrating a "relationship between the positions of the objects, and the detectable areas of the radar sensor and the camera sensor" at a time point (second time point) a predetermined time after the first time point.

It is now assumed that, as illustrated in FIG. 8, the object OB1 moves as illustrated by an arrow DR1 and the object OB2 moves as illustrated by an arrow DR2 in a period from the first time point to a second time point (time point a predetermined time after the first time point). At the second time point, the object OB1 does not exist within the detectable area of the camera sensor 17 but exists within the detectable area of the radar sensor 16a. Furthermore, the object OB2 neither exists in the detectable area of the radar sensor 16a nor the detectable area of the camera sensor 17. At the second time point, the CPU recognizes the object OB1 based on the single-sensor object information (specifically, the radar-sensor object information). Since the object OB1 is continuously detected by the radar sensor 16a from the first time point to the second time point, the object ID of the object OB1 is the same as the object ID ("ID1") assigned at the first time point.

On the other hand, at the second time point, the CPU cannot recognize the object OB2 based on the two-sensor object information, and also cannot recognize the object OB2 based on the single-sensor object information. Therefore, the above-mentioned Condition A is satisfied. The CPU makes a "Yes" determination in Step 620, and proceeds to Step 630. In Step 630, the CPU deletes information on the fusion object satisfying Condition A (that is, information on the object OB2) from the FSN information 400. Thereafter, the CPU proceeds to Step 695 to tentatively terminate this routine. In this manner, the CPU removes/erases, from the FSN information 400, information on the object which cannot be recognized based on the two-sensor object information and cannot be also recognized based on the single-sensor object information.

Figure 9:
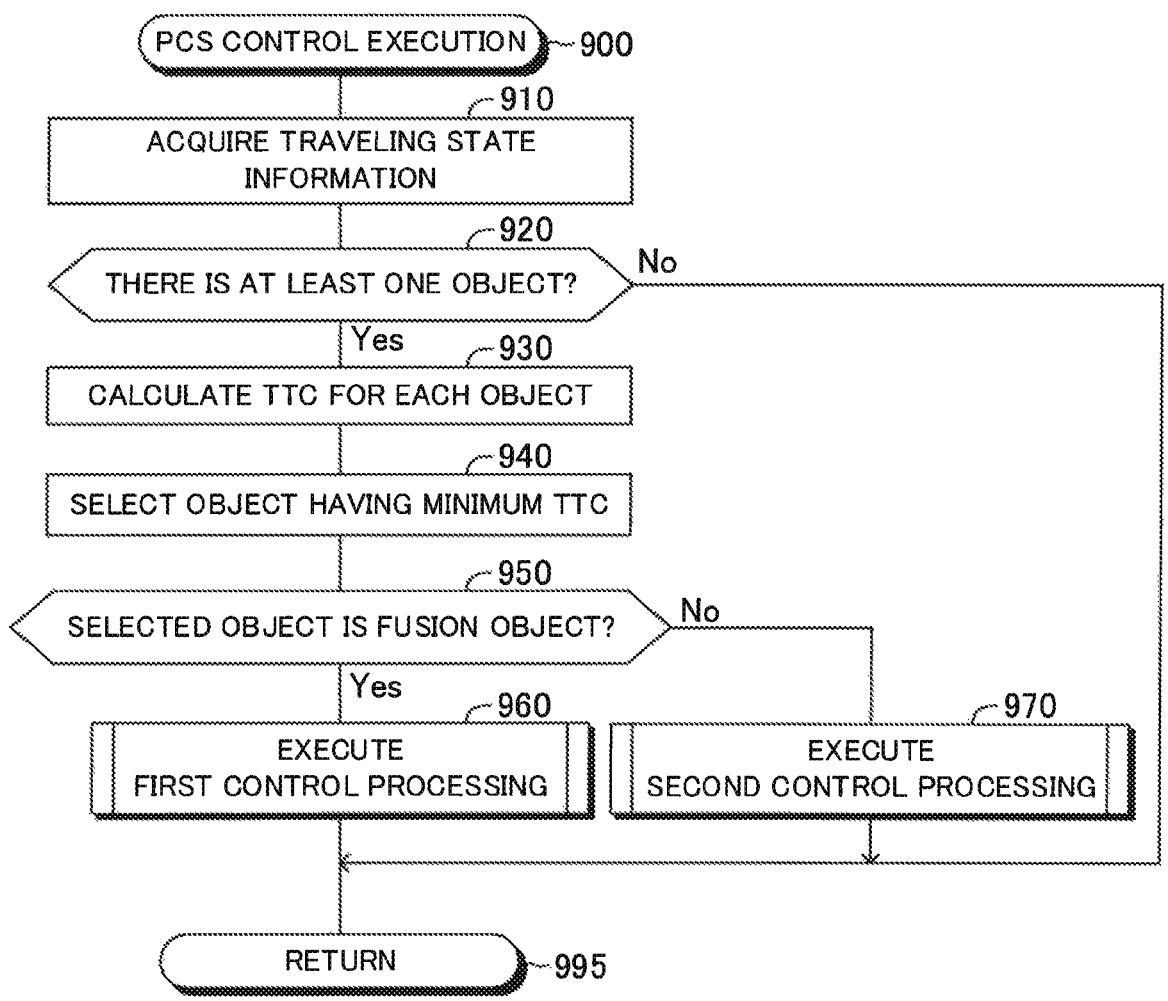
FIG. 9 is a flowchart for illustrating a "pre-collision safety control (PCS control) execution routine" to be executed by the PCS ECU in the first apparatus.

Further, the CPU is configured to execute the routine illustrated in FIG. 9 each time a predetermined time elapses. When a predetermined timing is reached, the CPU starts the processing from Step 900 of FIG. 9, and proceeds to Step 910. In Step 910, the CPU acquires the traveling state information (including the accelerator pedal operation amount AP, the brake pedal operation amount BP, the vehicle speed SPD, the actual yaw rate YRt, and the like).

Next, the CPU proceeds to Step 920, and determines whether or not there is at least one object in the peripheral region of the vehicle SV based on the two-sensor object information and the single-sensor object information. When there is no object in the peripheral region of the vehicle SV, the CPU makes a "No" determination in Step 920, and proceeds directly to Step 995 to tentatively terminate this routine.

On the other hand, when there is at least one object in the peripheral region of the vehicle SV, the CPU makes a "Yes" determination in Step 920, and executes the processing of Step 930 and Step 940 (described below) in sequence. Thereafter, the CPU proceeds to Step 950.

Step 930: The CPU calculates the collision prediction time TTC for each object based on the traveling state information and the object information (the two-sensor object information and the single-sensor object information). In one example, based on the traveling direction of the vehicle SV and the moving directions of the objects, the CPU may extract from among the recognized objects only objects which are present in the area where there is a possibility of collision with the vehicle SV. In this example, the CPU calculates the collision prediction time TTC for each of the extracted objects.

Step 940: The CPU selects an object having the shortest collision prediction time TTC among the collision prediction times TTC calculated in Step 930. Hereinafter, the object selected in this step is referred to as a "selected object". Furthermore, the collision prediction time TTC of the selected object is denoted as "$TTC_{min}$".

Figure 10:
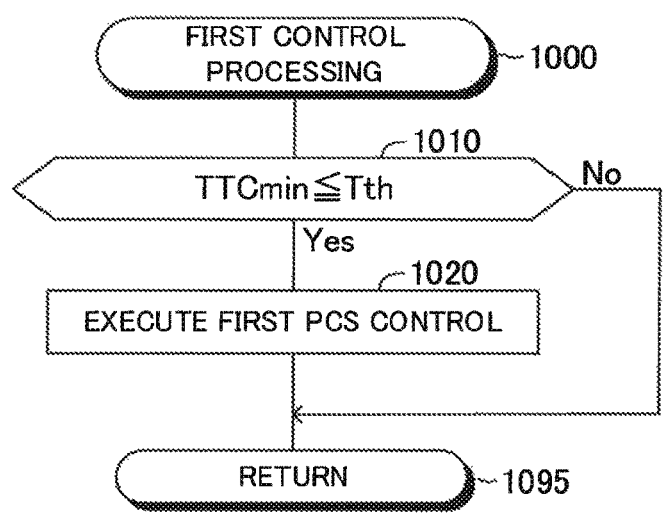
FIG. 10 is a flowchart for illustrating a "first control processing routine" to be executed by the PCS ECU in the first apparatus.

As the CPU proceeds to Step 950, the CPU determines whether or not the selected object is the fusion object. That is, the CPU determines whether or not the selected object is an object recognized based on the two-sensor object information at the present time. When the selected object is the fusion object, the CPU makes a "Yes" determination in Step 950, and proceeds to Step 960 to execute a "first control processing routine (described later)" illustrated in FIG. 10. Thereafter, the CPU proceeds to Step 995 to tentatively terminate this routine.

On the other hand, when the selected object is not the fusion object (that is, the selected object is an object recognized based on the single-sensor object information at the present time), the CPU makes a "No" determination in Step 950, and proceeds to Step 970 to execute a "second control processing routine (described later)" illustrated in FIG. 11. Thereafter, the CPU proceeds to Step 995 to tentatively terminate this routine.

Next, the first control processing routine executed in Step 960 by the CPU will be described. As the CPU proceeds to Step 960, the CPU starts the processing from Step 1000 of FIG. 10, and proceeds to Step 1010. In Step 1010, the CPU determines whether or not the collision prediction time $TTC_{min}$ of the selected object is equal to or shorter than the time threshold Tth.

When the collision prediction time $TTC_{min}$ is not equal to or shorter than the time threshold Tth, the CPU makes a "No" determination in Step 1010, and proceeds directly to Step 1095 to tentatively terminate this routine. In this case, the PCS control is not executed.

On the other hand, when the collision prediction time $TTC_{min}$ is equal to or shorter than the time threshold Tth, the CPU makes a "Yes" determination in Step 1010, and proceeds to Step 1020 to execute the first PCS control. Thereafter, the CPU proceeds to Step 1095 to tentatively terminate this routine.

Next, the second control processing routine executed in Step 970 by the CPU will be described. As the CPU proceeds to Step 970, the CPU starts the processing from Step 1100 of FIG. 11, and proceeds to Step 1110. In Step 1110, the CPU determines whether or not the collision prediction time $TTC_{min}$ of the selected object is equal to or shorter than the time threshold Tth. When the collision prediction time $TTC_{min}$ is not equal to or shorter than the time threshold Tth, the CPU makes a "No" determination in Step 1110, and proceeds directly to Step 1195 to tentatively terminate this routine.

On the other hand, when the collision prediction time $TTC_{min}$ is equal to or shorter than the time threshold Tth, the CPU makes a "Yes" determination in Step 1110, and proceeds to Step 1120. In Step 1120, the CPU determines whether or not the selected object is an object recorded/stored in the FSN information 400. That is, the CPU determines whether the selected object is an object recognized based on the single-sensor object information at the present time, but was an object previously recognized based on the two-sensor object information. Specifically, when the object ID of the selected object has been already recorded in the object ID 401 of the FSN information 400 at the present time, the CPU determines that the selected object is an object recorded in the FSN information 400 (that is, object which was previously recognized based on the two-sensor object information).

It is assumed that the current situation is the situation at the second time point as illustrated in FIG. 8. In this situation, the selected object is the object OB1. The object OB1 was recognized based on the two-sensor object information at the first time point (see FIG. 7) the predetermined time before the second time point, and therefore, information on the object OB1 was recorded in the FSN information 400 (see FIG. 4). The CPU makes a "Yes" determination in Step 1020, and proceeds to Step 1130 to execute the first PCS control. Thereafter, the CPU proceeds to Step 1195 to tentatively terminate this routine.

On the other hand, when the selected object is not an object recorded in the FSN information 400, the CPU makes a "No" determination in Step 1120, and proceeds to Step 1140 to execute the second PCS control. Thereafter, the CPU proceeds to Step 1195 to tentatively terminate this routine.

As described above, when the first apparatus recognizes an object based on the two-sensor object information, the first apparatus records information on the recognized object in the FSN information 400. When the selected object is an object recognized based on the single-sensor object information (Step 950:No), the first apparatus refers to the FSN information 400. Based on the FSN information 400, the first apparatus determines whether or not the selected object is an object which was previously recognized based on the two-sensor object information (Step 1120). When the FSN information 400 indicates that the selected object is an object previously recognized based on the two-sensor object information (Step 1120:Yes), the first apparatus can estimate that there is a high possibility that the selected object actually exists in the peripheral region of the vehicle SV. In this manner, when the first apparatus recognizes an object based on the single-sensor object information, the first apparatus can accurately determine whether the recognized object actually exists in the peripheral region of the vehicle SV. When the selected object is an object previously recognized based on the two-sensor object information, the first apparatus executes the first PCS control. Therefore, it is possible to increase the possibility of avoiding a collision of the vehicle SV with the object. Further, it is possible to reduce the frequency at which the first PCS control (including not only the alert control but also the braking force control and the driving force suppression control) is unnecessarily executed.

On the other hand, when the selected object is not an object previously recognized based on the two-sensor object information (Step 1120:No), there is a possibility that the selected object has been misrecognized. That is, there is a possibility that the selected object does not actually exist in the peripheral region of the vehicle SV. Therefore, the first apparatus executes the second PCS control. In the second PCS control, only the alert control is executed without executing the braking force control and the driving force suppression control. The first apparatus does not decelerate the vehicle SV while alerting the driver. Therefore, it is possible to avoid that the braking force control and the driving force suppression control are executed in an unnecessary situation (that is, a situation in which there is no object). Accordingly, it is possible to reduce the possibility of giving the driver an excessive sense of discomfort.

Second Embodiment

Next, a collision avoidance control apparatus (hereinafter, referred to as a "second apparatus") according to a second embodiment of the present disclosure will be described. The operation of the second apparatus is different from that of the first apparatus in a situation in which the selected object recognized based on the single-sensor object information is not an object previously recognized based on the two-sensor object information. Specifically, the second apparatus determines whether to execute the PCS control depending on whether the selected object is an object recognized based on the radar-sensor object information or the camera-sensor object information. Hereinafter, a difference with the operation of the first apparatus will be mainly described.

In general, the accuracy of the camera sensor 17 for detecting an object (in particular, the longitudinal distance Dfx to the object) is lower than that of the radar sensors 16. Therefore, in a situation in which the selected object is not an object recorded in the FSN information 400, the second apparatus executes the PCS control (more specifically, the second PCS control) when the selected object is an object recognized based on the radar-sensor object information. On the other hand, when the selected object is an object recognized based on the camera-sensor object information, the second apparatus does not execute the PCS control (any of the first PCS control and the second PCS control).

(Operation)

Figure 11:
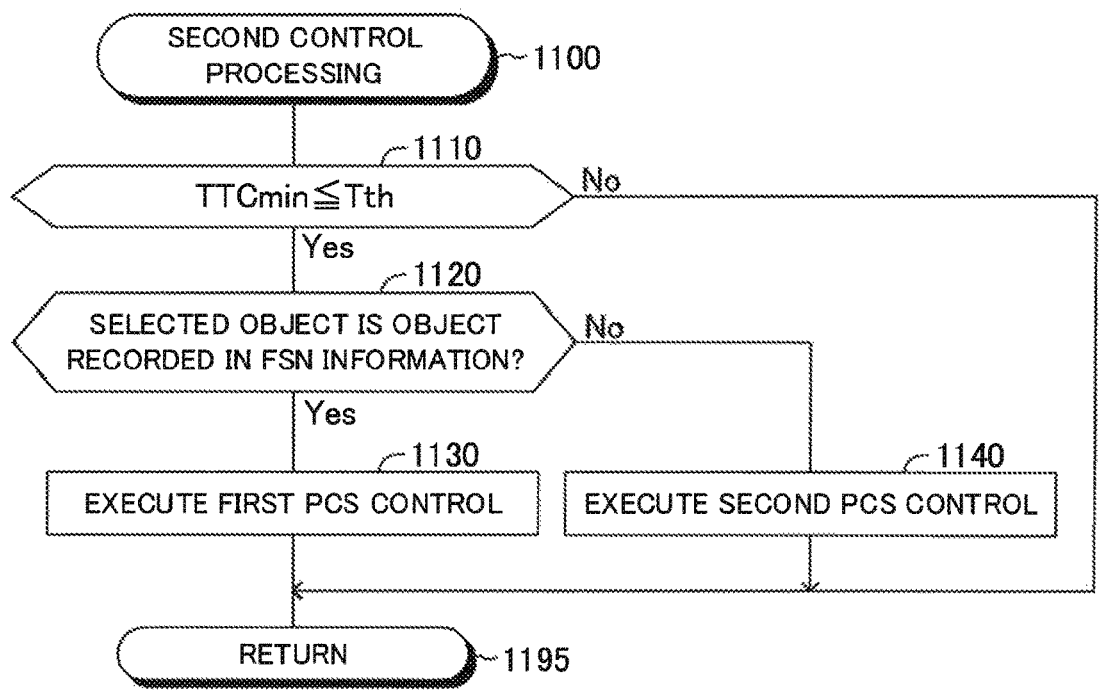
FIG. 11 is a flowchart for illustrating a "second control processing routine" to be executed by the PCS ECU in the first apparatus.
Figure 12:
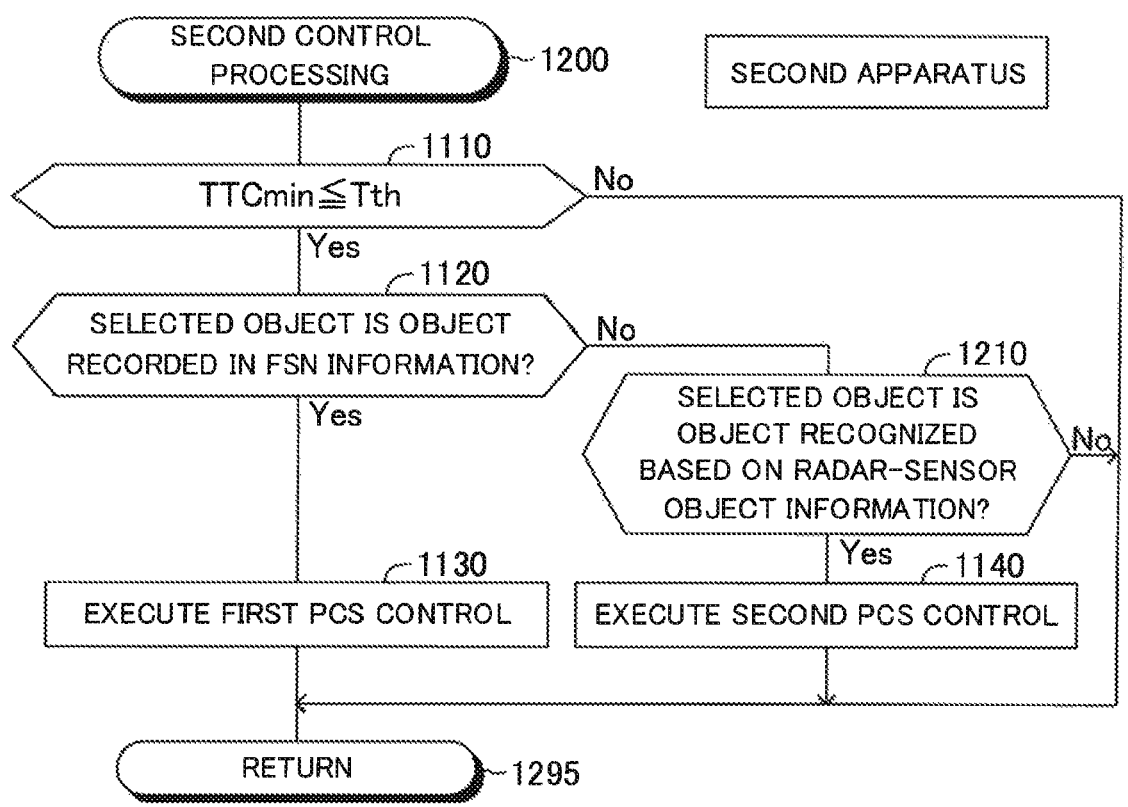
FIG. 12 is a flowchart for illustrating a "second control processing routine" to be executed by the PCS ECU in a collision avoidance control apparatus (second apparatus) according to a second embodiment.

In the second apparatus, as the CPU proceeds to Step 970 in FIG. 9, the CPU is configured to execute a routine illustrated in FIG. 12 in place of the routine of FIG. 11. The routine of FIG. 12 is a routine that starts processing from Step 1200 and in which Step 1210 is added to the routine of the FIG. 11. In FIG. 12, steps in which the same processing as that in the steps illustrated in FIG. 11 is executed are indicated by the same reference numerals of FIG. 11 indicating those steps. Therefore, a detailed description is omitted for the steps indicated by the same reference numerals as those of FIG. 11.

When the CPU makes a "No" determination in Step 1120 of the routine illustrated in FIG. 12, the CPU proceeds to Step 1210. In Step 1210, the CPU determines whether or not the selected object is an object recognized based on the radar-sensor object information. When the selected object is an object recognized based on the radar-sensor object information, the CPU makes a "Yes" determination in Step 1210, and proceeds to Step 1140 to execute the second PCS control. Thereafter, the CPU proceeds to Step 1295 to tentatively terminate this routine.

On the other hand, when the selected object is not an object recognized based on the radar-sensor object information (that is, the selected object is an object recognized based on the camera-sensor object information), the CPU makes a "No" determination in Step 1210, and proceeds directly to Step 1295 to tentatively terminate this routine. In this case, the PCS control is not executed.

As described above, the accuracy of the camera sensor 17 for detecting an object is lower than that of the radar sensors 16. In view of this, when the selected object is an object recognized based on the camera-sensor object information as the single-sensor object information, it is considered that there is a relatively low possibility that the recognized object actually exists in the peripheral region of the vehicle SV. Therefore, the second apparatus does not execute the PCS control (any of the first PCS control and the second PCS control) when the following conditions are satisfied: (i) the selected object is an object recognized based on the single-sensor object information, and is not an object recorded in the FSN information 400; and (ii) the selected object is an object recognized based on the camera-sensor object information. Accordingly, it is possible to lower the possibility of alerting the driver in an unnecessary situation (that is, a situation in which there is no object).

Third Embodiment

Next, a collision avoidance control apparatus (hereinafter, referred to as a "third apparatus") according to a third embodiment of the present disclosure will be described. The third apparatus is different from the first apparatus in that it determines whether to execute the PCS control depending on the vehicle speed SPD and the accelerator pedal operation amount AP. Hereinafter, the operation of the third apparatus will be described in the following cases: (a) the selected object is an object recognized based on the two-sensor object information; and (b) the selected object is an object recognized based on the single-sensor object information.

(a) The Selected Object is an Object Recognized Based on the Two-Sensor Object Information When the collision prediction time $TTC_{min}$ of the selected object is equal to or shorter than the time threshold Tth, the PCS ECU 10 of the third apparatus determines whether to execute the PCS control based on the traveling state information. Specifically, the PCS ECU 10 determines whether or not the vehicle speed SPD is equal to or higher than a predetermined speed threshold SPth. The speed threshold SPth is a threshold for determining whether the vehicle SV is traveling at a low speed. When the vehicle speed SPD is equal to or higher than the speed threshold SPth, the PCS ECU 10 determines whether or not the accelerator pedal operation amount AP is smaller than a predetermined operation amount threshold APth. The operation amount threshold APth is a threshold for determining whether the driver is stepping on the accelerator pedal 11a relatively strongly. The PCS ECU 10 selects and executes either the first PCS control or the second PCS according to the determination result.

Hereinafter, a "situation in which the vehicle speed SPD is equal to or higher than the speed threshold SPth and the driver does not step on the accelerator pedal 11a relatively strongly" is referred to as a "first situation". In the first situation, the vehicle is likely to collide with an object, and therefore, the PCS ECU 10 executes the first PCS control. Hereinafter, a "situation in which the vehicle speed SPD is equal to or higher than the speed threshold SPth and the driver steps on the accelerator pedal 11a relatively strongly" is referred to as a "second situation". In the second situation, the PCS ECU 10 gives priority to the driver's intention. That is, in the second situation, the PCS ECU 10 executes the second PCS control to only alert the driver.

Hereinafter, a "situation in which the vehicle speed SPD is lower than the speed threshold SPth and the operation amount AP of the accelerator pedal 11a is equal to or larger than the operation amount threshold APth" is referred to as a "third situation". The third situation means that, although the vehicle is traveling at a low speed, the driver is stepping on the accelerator pedal 11a relatively strongly. In this case, there is a high possibility that the driver erroneously depresses the accelerator pedal 11a instead of the brake pedal 12a. Therefore, in the third situation, the PCS ECU 10 executes the first PCS control because there is a possibility that the vehicle SV collides with an object.

(b) The Selected Object is an Object Recognized Based on the Single-Sensor Object Information In this case, there is a possibility that the selected object has been misrecognized. That is, there is a possibility that the selected object does not actually exist in the peripheral region of the vehicle. Therefore, in the first situation, the PCS ECU 10 executes the second PCS control to only alert the driver. Further, in the second situation, the PCS ECU 10 prioritizes the driver's intention, and thus does not execute the PCS control. In addition, in the above-mentioned first and second situations, the PCS ECU 10 does not refer to the FSN information 400. That is, the PCS ECU 10 does not determine whether or not the selected object is an object recorded in the FSN information 400.

Meanwhile, in the third situation, the PCS ECU 10 determines whether or not the selected object is an object recorded in the FSN information 400. When the selected object is an object recorded in the FSN information 400, the PCS ECU 10 can estimate that there is a high possibility that the selected object actually exists in the peripheral region of the vehicle SV. Therefore, in the third situation, when the selected object is an object recorded in the FSN information 400, the PCS ECU 10 executes the first PCS control to decelerate the vehicle SV. On the other hand, when the selected object is not an object recorded in the FSN information 400 in the third situation, the PCS ECU 10 executes the second PCS control to only alert the driver.

(Operation)

The "first control processing routine" executed in Step 960 of FIG. 9 by the CPU of the PCS ECU 10 of the third apparatus will be described. As the CPU proceeds to Step 960, the CPU is configured to execute a routine illustrated in FIG. 13 in place of the routine of FIG. 10.

Figure 13:
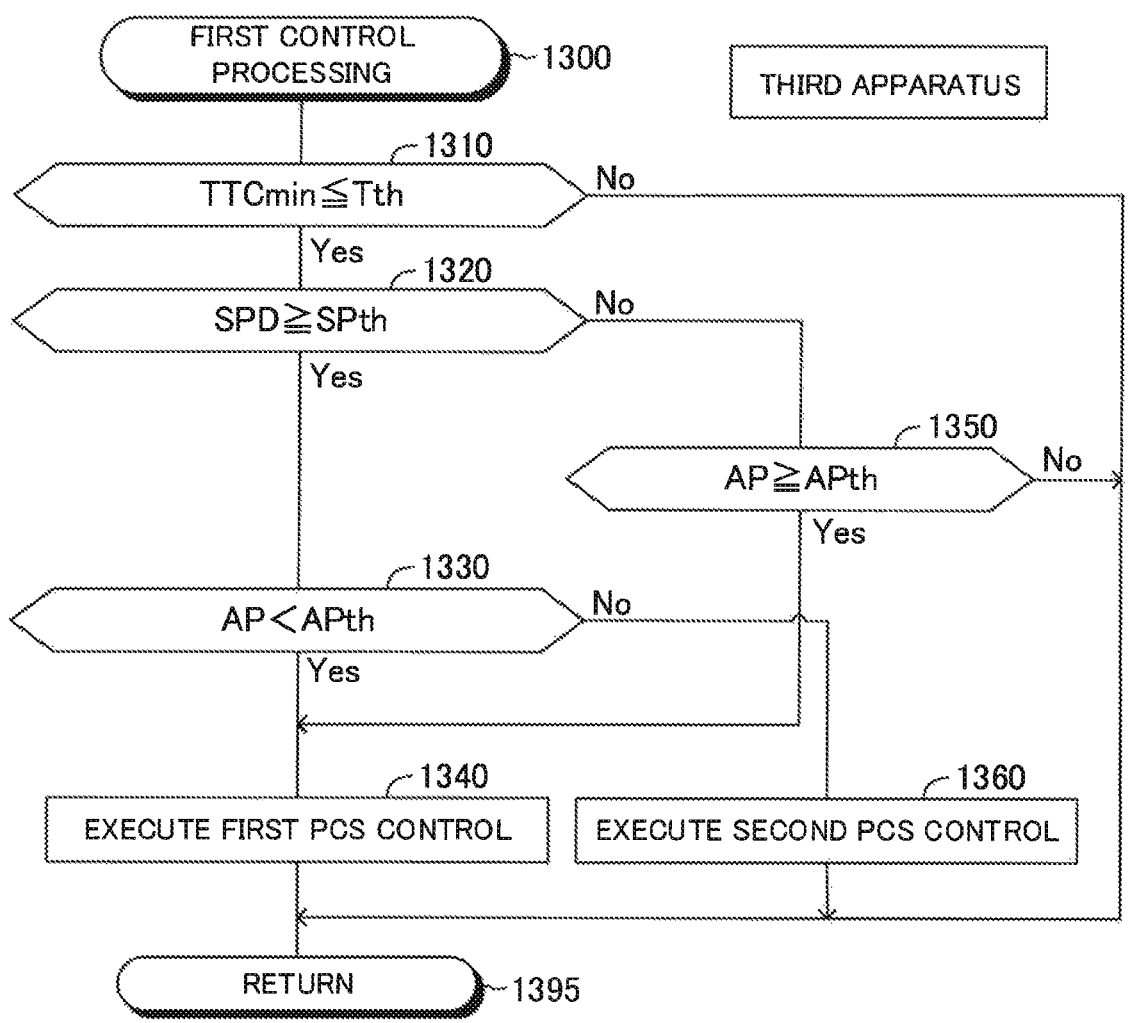
FIG. 13 is a flowchart for illustrating a "first control processing routine" to be executed by the PCS ECU in a collision avoidance control apparatus (third apparatus) according to a third embodiment.

As the CPU proceeds to Step 960, the CPU starts the processing from Step 1300 of FIG. 13, and proceeds to Step 1310. In Step 1310, the CPU determines whether or not the collision prediction time $TTC_{min}$ of the selected object is equal to or shorter than the time threshold Tth. When the collision prediction time $TTC_{min}$ is not equal to or shorter than the time threshold Tth, the CPU makes a "No" determination in Step 1310, and proceeds directly to Step 1395 to tentatively terminate this routine.

On the other hand, when the collision prediction time $TTC_{min}$ is equal to or shorter than the time threshold Tth, the CPU makes a "Yes" determination in Step 1310, and proceeds to Step 1320. In Step 1320, the CPU determines whether or not the vehicle speed SPD is equal to or higher than the speed threshold SPth. When the vehicle speed SPD is equal to or higher than the speed threshold SPth, the CPU makes a "Yes" determination in Step 1320, and proceeds to Step 1330 to determine whether or not the accelerator pedal operation amount AP is smaller than the operation amount threshold APth.

When the accelerator pedal operation amount AP is smaller than the operation amount threshold APth, the CPU makes a "Yes" determination in Step 1330, and proceeds to Step 1340 to execute the first PCS control. Thereafter, the CPU proceeds to Step 1395 to tentatively terminate this routine.

When the accelerator pedal operation amount AP is not smaller than the operation amount threshold APth, the CPU makes a "No" determination in Step 1330, and proceeds to Step 1360 to execute the second PCS control. Thereafter, the CPU proceeds to Step 1395 to tentatively terminate this routine.

At the time point at which the CPU proceeds to Step 1320, when the vehicle speed SPD is not equal to or higher than the speed threshold SPth, the CPU makes a "No" determination in Step 1320, and proceeds to Step 1350. In Step 1350, the CPU determines whether or not the accelerator pedal operation amount AP is equal to or larger than the operation amount threshold APth. When the accelerator pedal operation amount AP is equal to or larger than the operation amount threshold APth, the CPU makes a "Yes" determination in Step 1350, and proceeds to Step 1340 to execute the first PCS control. Thereafter, the CPU proceeds to Step 1395 to tentatively terminate this routine.

On the other hand, when the accelerator pedal operation amount AP is not equal to or larger than the operation amount threshold APth, the CPU makes a "No" determination in Step 1350, and proceeds directly to Step 1395 to tentatively terminate this routine. This situation does not correspond to any of the above-mentioned first to third situations. However, the collision prediction time $TTC_{min}$ is equal to or shorter than the time threshold Tth and the selected object is the fusion object. Therefore, the CPU may be configured to make a "No" determination in Step 1350, and proceed to Step 1360. In this example, the CPU executes the second PCS control to thereby alert the driver.

The "second control processing routine" executed in Step 970 of FIG. 9 by the CPU will be described. As the CPU proceeds to Step 970, the CPU is configured to execute a routine illustrated in FIG. 14 in place of the routine of FIG. 11.

Figure 14:
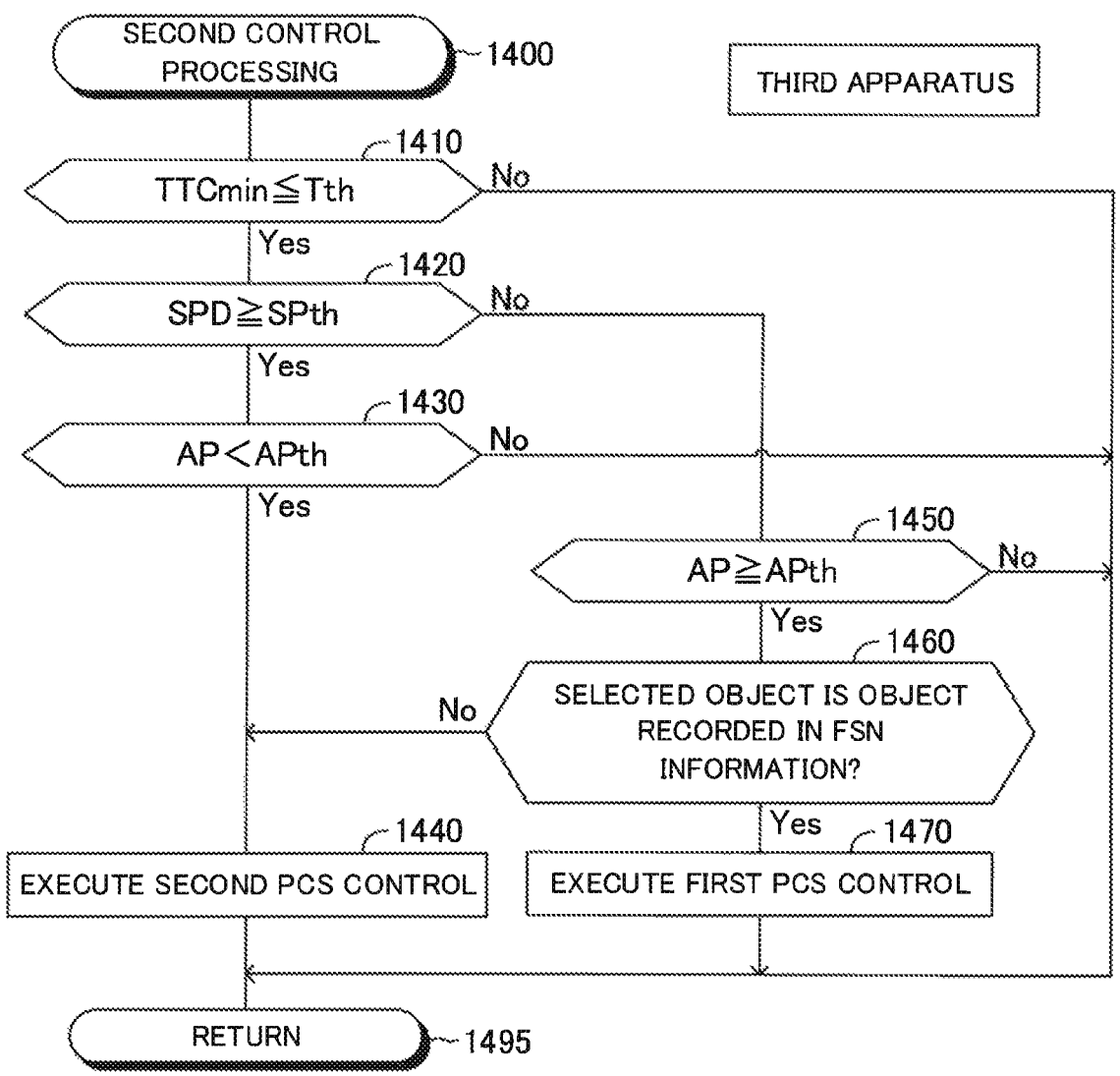
FIG. 14 is a flowchart for illustrating a "second control processing routine" to be executed by the PCS ECU in the third apparatus.

As the CPU proceeds to Step 970, the CPU starts the processing from Step 1400 of FIG. 14, and proceeds to Step 1410. In Step 1410, the CPU determines whether or not the collision prediction time $TTC_{min}$ of the selected object is equal to or shorter than the time threshold Tth. When the collision prediction time $TTC_{min}$ is not equal to or shorter than the time threshold Tth, the CPU makes a "No" determination in Step 1410, and proceeds directly to Step 1495 to tentatively terminate this routine.

On the other hand, when the collision prediction time $TTC_{min}$ is equal to or shorter than the time threshold Tth, the CPU makes a "Yes" determination in Step 1410, and proceeds to Step 1420. In Step 1420, the CPU determines whether or not the vehicle speed SPD is equal to or higher than the speed threshold SPth. When the vehicle speed SPD is equal to or higher than the speed threshold SPth, the CPU makes a "Yes" determination in Step 1420, and proceeds to Step 1430 to determine whether or not the accelerator pedal operation amount AP is smaller than the operation amount threshold APth.

When the accelerator pedal operation amount AP is smaller than the operation amount threshold APth, the CPU makes a "Yes" determination in Step 1430, and proceeds to Step 1440 to execute the second PCS control. Thereafter, the CPU proceeds to Step 1495 to tentatively terminate this routine.

When the accelerator pedal operation amount AP is not smaller than the operation amount threshold APth, the CPU makes a "No" determination in Step 1430, and proceeds directly to Step 1495 to tentatively terminate this routine. In this case, the PCS control is not executed.

At the time point at which the CPU proceeds to Step 1420, when the vehicle speed SPD is not equal to or higher than the speed threshold SPth, the CPU makes a "No" determination in Step 1420, and proceeds to Step 1450. In Step 1450, the CPU determines whether or not the accelerator pedal operation amount AP is equal to or larger than the operation amount threshold APth. When the accelerator pedal operation amount AP is not equal to or larger than the operation amount threshold APth, the CPU makes a "No" determination in Step 1450, and proceeds directly to Step 1495 to tentatively terminate this routine. In this case, the PCS control is not executed.

On the other hand, when the accelerator pedal operation amount AP is equal to or larger than the operation amount threshold APth, the CPU makes a "Yes" determination in Step 1450, and proceeds to Step 1460. In Step 1460, the CPU determines whether or not the selected object is an object recorded in the FSN information 400. When the selected object is an object recorded in the FSN information 400, the CPU makes a "Yes" determination in Step 1460, and proceeds to Step 1470 to execute the first PCS control. Thereafter, the CPU proceeds to Step 1495 to tentatively terminate this routine.

When the selected object is not an object recorded in the FSN information 400, the CPU makes a "No" determination in Step 1460, and proceeds to Step 1440 to execute the second PCS control. Thereafter, the CPU proceeds to Step 1495 to tentatively terminate this routine.

In the third situation (Step 1420:No, and Step 1450:Yes), there is a high possibility that the driver erroneously steps the accelerator pedal 11a instead of the brake pedal 12a. Therefore, it is preferable that the PCS control be executed. However, when the selected object is an object recognized based on the single-sensor object information, there is a possibility that the selected object has been misrecognized. In view of this, the third apparatus determines whether or not the selected object is an object recorded in the FSN information 400. When the selected object is an object recorded in the FSN information 400, the third apparatus can estimate that the selected object actually exists in the peripheral region of the vehicle. Therefore, when the selected object is an object recorded in the FSN information 400, the third apparatus executes the first PCS control. It is possible to increase the possibility of avoiding a collision of the vehicle with the object. On the other hand, when the selected object is not an object recorded in the FSN information 400, the third apparatus executes the second PCS control. Thus, it is possible to avoid the execution of the braking force control in an unnecessary situation (that is, a situation in which there is no object).

Fourth Embodiment

Next, a collision avoidance control apparatus (hereinafter, referred to as a "fourth apparatus") according to a fourth embodiment of the present disclosure will be described. The operation of the fourth apparatus is different from that of the third apparatus in a situation in which the selected object is an object recognized based on the single-sensor object information, and is not an object recorded in the FSN information 400. Specifically, the fourth apparatus determines whether to execute the PCS control depending on whether the selected object is an object recognized based on the radar-sensor object information or the camera-sensor object information. Hereinafter, a difference with the operation of the third apparatus will be mainly described.

(Operation)

Figure 15:
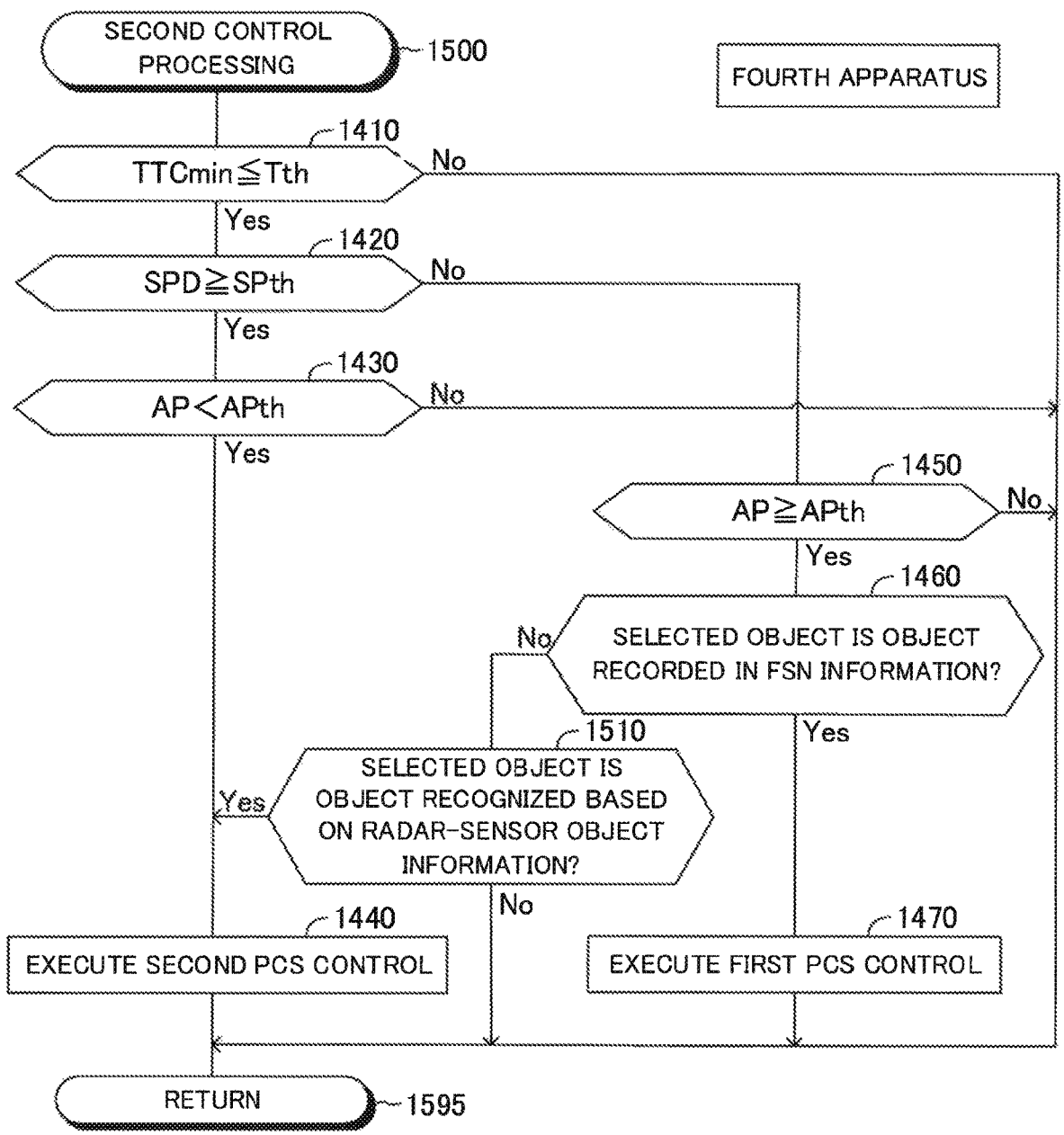
FIG. 15 is a flowchart for illustrating a "second control processing routine" to be executed by the PCS ECU in a collision avoidance control apparatus (fourth apparatus) according to a fourth embodiment.

In the fourth apparatus, as the CPU of the PCS ECU 10 proceeds to Step 970 of FIG. 9, the CPU is configured to execute a routine illustrated in FIG. 15 in place of the routine of FIG. 14. The routine of FIG. 15 is a routine that starts processing from Step 1500 and in which Step 1510 is added to the routine of the FIG. 14. In FIG. 15, steps in which the same processing as that in the steps illustrated in FIG. 14 is executed are indicated by the same reference numerals of FIG. 14 indicating those steps. Therefore, a detailed description is omitted for the steps indicated by the same reference numerals as those of FIG. 14.

As the CPU makes a "No" determination in Step 1460 of FIG. 15, the CPU proceeds to Step 1510. In Step 1510, the CPU determines whether or not the selected object is an object recognized based on the radar-sensor object information. When the selected object is an object recognized based on the radar-sensor object information, the CPU makes a "Yes" determination in Step 1510, and proceeds to Step 1440 to execute the second PCS control. Thereafter, the proceeds to Step 1595 to tentatively terminate this routine.

On the other hand, when the selected object is not an object recognized based on the radar-sensor object information (that is, the selected object is an object recognized based on the camera-sensor object information), the CPU makes a "No" determination in Step 1510, and proceeds directly to Step 1595 to tentatively terminate this routine. In this case, the PCS control is not executed.

As described above, in a case where the selected object is not an object recorded in the FSN information 400 in the above-mentioned third situation (Step 1420:No, Step 1450: Yes, and Step 1460:No), the fourth apparatus determines whether or not the selected object is an object recognized based on the radar-sensor object information.

When the selected object is not an object recognized based on the radar-sensor object information (that is, the selected object is an object recognized based on the camera-sensor object information), the fourth apparatus does not execute the PCS control (the second PCS control). Therefore, it is possible to lower the possibility of alerting the driver in an unnecessary situation (that is, a situation in which there s no object).

The present disclosure is not limited to the embodiments described above, and various modification examples can be adopted within the scope of the present disclosure.

Modification Example 1

The first PCS control is not limited to the above example. The first PCS control may be other control as long as it includes at least the braking force control. In one aspect, the first PCS control may include only the braking force control.

In one aspect, the first PCS control may include seat belt control (safety belt control) in addition to the braking force control. In this aspect, the PCS ECU 10 is connected to a seat belt actuator (not shown). The seat belt actuator is an actuator for fastening the seat belt more strongly to thereby reduce slack of the seat belt. Upon receiving an instruction signal from the PCS ECU 10, the seat belt actuator executes control for fastening the seat belt.

In one aspect, the first PCS control may include steering control in addition to the braking force control. In this aspect, the PCS ECU 10 may calculate a collision avoidance path (route) based on the object information, and execute control for driving the assist motor 41 to move the vehicle SV along the collision avoidance path.

Modification Example 2

The second PCS control is not limited to the above example. The second PCS control may include other control as long as it includes the alert control and does not include the braking force control. In one aspect, the second PCS control may be control including only the alert control and the driving force suppression control.

Modification Example 3

A plurality of ultrasonic sensors or a plurality of LIDARs (Light Detection and Ranging/Laser Imaging Detection and Ranging) may be used in place of the radar sensors 16. Each of the plurality of ultrasonic sensors acquires "information on a reflection point which is a point on an object from which a transmitted ultrasonic wave is reflected" based on a period from the transmission of the ultrasonic wave to the reception of the ultrasonic wave. The OD ECU 18 calculates ultrasonic-sensor detection information based on the information on the reflection point. The ultrasonic-sensor detection information includes the longitudinal distance Dfx of the object, the azimuth orientation θp of the object with respect to the vehicle SV, the relative speed Vfx between the object and the vehicle SV, and the like. The OD ECU 18 integrates the "ultrasonic-sensor detection information" and the "camera-sensor detection information" (that is, executes the fusion processing of the ultrasonic-sensor detection information and the camera-sensor detection information). Thus, the OD ECU 18 acquires (determines) the final object information on the object (n).

Modification Example 4

The deletion condition in Step 620 of the routine illustrated in FIG. 6 is not limited to the above example. The deletion condition may include the following Condition B in addition to Condition A.

(Condition B) Among the fusion objects stored in the FSN information 400, there is at least one object of which an elapsed time from the detection time 402 to the current time point is equal to or longer than a predetermined elapsed time threshold TMth.

When the elapsed time threshold TMth or longer has elapsed since the time point (detection time 402) at which the object was first recognized as the fusion object, it is considered that the reliability of whether or not the object actually exists is low. The PCS ECU 10 may delete information on such an object from the FSN information 400.

What is claimed is:

1. A collision avoidance control apparatus for a vehicle, comprising:
   a first sensor configured to, through use of an electromagnetic wave or an ultrasonic wave, detect an object present in a predetermined peripheral area of the vehicle, and acquire first detection information which is information on the detected object;
   a second sensor configured to capture a predetermined peripheral range of the vehicle to acquire image data, detect an object present in the peripheral range through use of the image data, and acquire second detection information which is information on the detected object;
   a controller configured to:
      determine whether or not there is an obstacle which is an object which is likely to collide with the vehicle based on first object information, second object information, and third object information, the first object information being information obtained by integrating the first detection information on a specific object and the second detection information on the specific object, the specific object being an object which has been detected by both of the first sensor and the second sensor, the second object information being the first detection information on an object which has been detected by the first sensor and has not been detected by the second sensor, and the third object information being the second detection information on an object which has been detected by the second sensor and has not been detected by the first sensor, and
      when determining that there is the obstacle, execute first collision avoidance control including at least braking force control for applying a braking force to wheels of the vehicle; and
   a memory configured to, when the specific object has been previously detected by both of the first sensor and the second sensor, record information on the previously detected specific object,
   wherein:
   the controller is configured to execute the first collision avoidance control when determining that there is the obstacle based on the first object information,
   the controller is configured to execute the first collision avoidance control when determining that there is the obstacle based on any one of the second object information and the third object information, and determining that a first condition is satisfied, the first condition being satisfied when the obstacle has been already recorded as the specific object in the memory, and
   the controller is configured not to execute the first collision avoidance control when determining that there is the obstacle based on any one of the second object information and the third object information, and determining that the first condition is not satisfied.

2. The collision avoidance control apparatus according to claim 1, wherein:
the controller is configured to select and execute any one of the first collision avoidance control and second collision avoidance control, the second collision avoidance control being control which includes alert control for alerting a driver of the vehicle and does not include the braking force control, and
the controller is configured to execute the second collision avoidance control when determining that there is the obstacle based on any one of the second object information and the third object information, and determining that the first condition is not satisfied.

3. The collision avoidance control apparatus according to claim 2, wherein:
the controller is configured to execute the second collision avoidance control when determining that there is the obstacle based on the second object information, and determining that the first condition is not satisfied, and
the controller is configured not to execute the second collision avoidance control when determining that there is the obstacle based on the third object information, and determining that the first condition is not satisfied.

4. The collision avoidance control apparatus according to claim 2, further comprising:
a vehicle speed sensor configured to detect a traveling speed of the vehicle; and
an accelerator pedal operation amount sensor configured to detect an operation amount of an accelerator pedal of the vehicle,
wherein:
the controller is configured to determine whether or not a second condition is satisfied, the second condition being satisfied when the traveling speed is lower than a predetermined speed threshold and the operation amount of the accelerator pedal is equal to or larger than a predetermined operation amount threshold,
the controller is configured to execute the first collision avoidance control when determining that there is the obstacle based on any one of the second object information and the third object information, and determining that the first condition and the second condition are satisfied, and
the controller is configured to execute the second collision avoidance control when determining that there is the obstacle based on any one of the second object information and the third object information, and determining that the first condition is not satisfied and the second condition is satisfied.

5. The collision avoidance control apparatus according to claim 4, wherein:
the controller is configured to execute the second collision avoidance control when determining that there is the obstacle based on the second object information, and determining that the first condition is not satisfied and the second condition is satisfied, and
the controller is configured not to execute the second collision avoidance control when determining that there is the obstacle based on the third object information, and determining that the first condition is not satisfied and the second condition is satisfied.

6. The collision avoidance control apparatus according to claim 1, further comprising:
a vehicle speed sensor configured to detect a traveling speed of the vehicle; and
an accelerator pedal operation amount sensor configured to detect an operation amount of an accelerator pedal of the vehicle,
wherein:
the controller is configured to determine whether or not a second condition is satisfied, the second condition being satisfied when the traveling speed is lower than a predetermined speed threshold and the operation amount of the accelerator pedal is equal to or larger than a predetermined operation amount threshold, and
the controller is configured to execute the first collision avoidance control when determining that there is the obstacle based on any one of the second object information and the third object information, and determining that the first condition and the second condition are satisfied.

7. The collision avoidance control apparatus according to claim 1, wherein the memory is configured to record, as part of the information on the detected specific object, an object ID and a detection time.

8. The collision avoidance control apparatus according to claim 7, wherein the object ID is identification information for identifying the object, and the detection time is time when the object corresponding to the object ID has been firstly detected by at least one of the first sensor and the second sensor.

* * * * *